(12) United States Patent
Kakinoki et al.

(10) Patent No.: US 10,780,940 B2
(45) Date of Patent: Sep. 22, 2020

(54) HUMAN-POWERED VEHICLE CONTROL DEVICE

(71) Applicant: Shimano Inc., Sakai, Osaka (JP)

(72) Inventors: Nobuyuki Kakinoki, Osaka (JP); Kentaro Kosaka, Osaka (JP); Keijiro Nishi, Osaka (JP); Ryo Yamazaki, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/233,037

(22) Filed: Dec. 26, 2018

(65) Prior Publication Data

US 2019/0217916 A1 Jul. 18, 2019

(30) Foreign Application Priority Data

Jan. 12, 2018 (JP) .................................. 2018-003845
May 29, 2018 (JP) .................................. 2018-102705

(51) Int. Cl.
*B62K 23/02* (2006.01)
*B62M 25/04* (2006.01)
*B62M 25/08* (2006.01)

(52) U.S. Cl.
CPC ............. *B62K 23/02* (2013.01); *B62M 25/04* (2013.01); *B62M 25/08* (2013.01)

(58) Field of Classification Search
CPC ........ B62K 23/02; B62M 25/04; B62M 25/08
USPC ....................................................... 74/501.6
See application file for complete search history.

(56) References Cited

U.S. PATENT DOCUMENTS

| | | | | |
|---|---|---|---|---|
| 2002/0033064 A1* | 3/2002 | Ose | ......................... | B62K 23/02 |
| | | | | 74/502.2 |
| 2003/0234163 A1* | 12/2003 | Ichida | ...................... | B62J 11/00 |
| | | | | 200/4 |
| 2014/0139977 A1* | 5/2014 | Kosaka | ................... | B62K 23/02 |
| | | | | 361/679.01 |

FOREIGN PATENT DOCUMENTS

| | | |
|---|---|---|
| CN | 1607159 A | 4/2005 |
| CN | 101580097 A | 11/2009 |
| CN | 204979100 U | 1/2016 |
| JP | 2014-196060 A | 10/2014 |

* cited by examiner

*Primary Examiner* — David H Bollinger
(74) *Attorney, Agent, or Firm* — Global IP Counselors, LLP

(57) ABSTRACT

A human-powered vehicle operating device including a base member, a first operating member, a second operating member, a first electrical switch and a second electrical switch. The first operating member includes a first operating surface and configured to pivot about a first axis with respect to the base member. The second operating member includes a second operating surface and configured to pivot about a second axis with respect to the base member. The first electrical switch is provided between the base member and the first operating member. The second electrical switch is provided between the base member and the second operating member. The first operating member and the second operating member are arranged next to each other in a first direction and configured to pivot independent from each other.

40 Claims, 15 Drawing Sheets

HUMAN-POWERED VEHICLE CONTROL DEVICE

CROSS-REFERENCE TO RELATED APPLICATIONS

This application claims priority to Japanese Patent Application Nos. 2018-003845, filed on Jan. 12, 2018, and 2018-102705, filed on May 29, 2018. The entire disclosures of Japanese Patent Application Nos. 2018-003845 and 2018-102705 are hereby incorporated herein by reference.

BACKGROUND

Technical Field

The present disclosure generally relates to a human-powered vehicle operating device.

Background Information

A human-powered vehicle includes an operating device operated by a user. Japanese Laid-Open Patent Publication No. 2014-196060 (Patent document 1) describes a human-powered vehicle operating device includes a clamp attached to a handlebar of a human-powered vehicle and an operating unit attached to the clamp. The operating unit includes a plurality of devices for operation.

SUMMARY

Preferably, the human-powered vehicle operating device is configured to be easily accessed by the user so that the user can comfortably ride the human-powered vehicle. It is an object of the present disclosure to provide a human-powered vehicle operating device that can be easily accessed by a user.

A human-powered vehicle operating device in accordance with a first aspect of the present disclosure includes a base member, a first operating member, a second operating member, a first electrical switch and a second electrical switch. The first operating member includes a first operating surface and is configured to pivot about a first axis with respect to the base member. The second operating member includes a second operating surface and is configured to be pivot about a second axis with respect to the base member. The first electrical switch is provided between the base member and the first operating member. The second electrical switch is provided between the base member and the second operating member. The first operating member and the second operating member are arranged next to each other in a first direction and configured to pivot independent from each other.

In the operating device, the first operating member is provided on the base member with the first electrical switch located in between, and the second operating member is provided on the base member with the second electrical switch located in between. Thus, the operating device can be reduced in size. This allows for easy access by the user.

In accordance with a second aspect of the present disclosure, the human-powered vehicle operating device according to the first aspect is configured so that the first axis and the second axis extend in a second direction.

In the operating device, the first axis serving as the center of pivot of the first operating member and the second axis serving as the center of pivot of the second operating member are parallel to or coincide with each other. Thus, each operating member pivots in the same direction. This improves the operability of each operating member.

In accordance with a third aspect of the present disclosure, the human-powered vehicle operating device according to the second aspect is configured so that the first direction is orthogonal to the second direction.

In the operating device, as the user moves a finger on the first operating surface of the first operating member in the first direction, the distance between the first axis and the point of force application changes. In a case where the point of force application is on or near the first axis, pivoting of the first operating member is limited.

In accordance with a fourth aspect of the present disclosure, the human-powered vehicle operating device according to the third aspect is configured so that the first operating surface is asymmetric with respect to a center line extending in the first direction of the first operating surface in a view taken in a direction orthogonal to the first direction and the second direction.

In accordance with the operating device, the user can easily recognize the part of the first operating surface from the touch of the shape of the first operating surface.

In accordance with a fifth aspect of the present disclosure, the human-powered vehicle operating device according to the fourth aspect is configured so that the first operating surface is increased in area from one side to another side in the second direction.

In accordance with the operating device, the user can easily recognize the part of the first operating surface from the touch of the area of the first operating surface.

In accordance with a sixth aspect of the present disclosure, the human-powered vehicle operating device according to the fourth or fifth aspect is configured so that the second operating surface is asymmetric with respect to a center line extending in the first direction of the second operating surface in a view taken in a direction orthogonal to the first direction and the second direction.

In accordance with the operating device, the user can easily recognize the part of the second operating surface from the touch of the shape of the second operating surface.

In accordance with a seventh aspect of the present disclosure, the human-powered vehicle operating device according to the sixth aspect is configured so that the second operating surface is increased in area from one side to another side in the second direction.

In accordance with the operating device, the user can easily recognize the part of the second operating surface from the touch of the area of the second operating surface.

In accordance with an eighth aspect of the present disclosure, the human-powered vehicle operating device according to any one of fourth to seventh aspects is configured so that the first operating surface and the second operating surface are line-symmetric with respect to the first axis and the second axis in a view taken in a direction orthogonal to the first direction and the second direction.

In accordance with the operating device, the user can easily recognize which of the first operating surface and the second operating surface from the touch of the shape of the first operating surface and the shape of the second operating surface at the finger.

In accordance with a ninth aspect of the present disclosure, the human-powered vehicle operating device according to any one of fourth to eighth aspects is configured so that the first operating surface is inclined toward the base member in a direction away from the first axis in the first direction.

In accordance with the operating device, the user can easily recognize the part of the first operating surface from the touch of the inclination of the first operating surface.

In accordance with a tenth aspect of the present disclosure, the human-powered vehicle operating device according to the ninth aspect is configured so that the first operating surface is inclined toward the base member from one side to another side in the second direction.

In accordance with the operating device, the user can easily recognize the part of the first operating surface from the touch of the inclination of the first operating surface.

In accordance with an eleventh aspect of the present disclosure, the human-powered vehicle operating device according to any one of fourth to tenth aspects is configured so that the second operating surface is inclined toward the base member side in a direction away from the second axis in the first direction.

In accordance with the operating device, the user can easily recognize the part of the second operating surface from the touch of the inclination of the second operating surface.

In accordance with a twelfth aspect of the present disclosure, the human-powered vehicle operating device according to the eleventh aspect is configured so that the second operating surface is inclined toward the base member from one side to another side in the second direction.

In accordance with the operating device, the user can easily recognize the part of the second operating surface from the touch of the inclination of the second operating surface.

In accordance with a thirteenth aspect of the present disclosure, the human-powered vehicle operating device according to any one of second to twelfth aspects is configured so that the base member has a dimension in the second direction set to be larger than or equal to 5 mm and smaller than or equal to 30 mm.

The base member is configured to be attached to a predetermined subject member provided on the human-powered vehicle. An example of a predetermined subject member is a tubular member provided on the human-powered vehicle. In accordance with the operating device, the area occupied by the base member on the predetermined subject member becomes narrower. Therefore, various operating devices including the operating device described above can be attached to the predetermined subject member.

In accordance with a fourteenth aspect of the present disclosure, the human-powered vehicle operating device according to any one of first to thirteenth aspects is configured so that the first axis and the second axis are defined by a pivot shaft.

In accordance with the operating device, the first operating member and the second operating member are arranged close to each other. This allows the user to further easily access each operating member.

In accordance with a fifteenth aspect of the present disclosure, in the operating device for the human powered vehicle according to the fourteenth aspect, the base member includes a clamp configured to be attached to a tubular member of the human-powered vehicle, and the pivot shaft is parallel to a center axis of the clamp.

In accordance with the operating device, in a case where the user moves a hand along the center axis of the clamp and accesses each operating member, the portion around the pivot shaft of the base member will not easily be touched by a finger. This allows the user to easily access each operating member.

In accordance with a sixteenth aspect of the present disclosure, the human-powered vehicle operating device according to the fifteenth aspect is configured so that the first operating member and the second operating member are symmetric to each other with respect to a plane including the pivot shaft and the center axis in a view taken in a direction parallel to the pivot shaft and the center axis.

The operating device can be configured to include a right operating device corresponding to the right hand of the user and a left side operating device corresponding to the left hand of the user. The first operating member and the second operating member are symmetric to each other with respect to a plane including the pivot shaft and the center axis. Thus, the right operating device and the left operating device can be configured by using common operating members.

In accordance with a seventeenth aspect of the present disclosure, in the human-powered vehicle operating device according to any one of first to fourteenth aspects, the base member is configured to be attached to the tubular member of the human-powered vehicle.

In a typical human-powered vehicle, the tubular member is provided on the cockpit. Therefore, the operating device including the base member can be installed at a location in the human-powered vehicle that is easily accessed by the user.

In accordance with an eighteenth aspect of the present disclosure, the human-powered vehicle operating device according to the seventeenth aspect is configured so that the base member has a dimension in an axial direction of the tubular member that is smaller than a dimension in an axial direction of the first operating member.

In accordance with the operating device, the area occupied by the base member on the tubular member becomes narrower. This limits interference of the base member with other elements attached to the tubular member.

In accordance with a nineteenth aspect of the present disclosure, the human-powered vehicle operating device according to any one of fifteenth to eighteenth aspects is configured so that the first direction extends along a circumferential direction of the tubular member.

In accordance with the operating device described above, the operating device can be reduced in size. Thus, the user can easily access each operating member.

In accordance with a twentieth aspect of the present disclosure, the human-powered vehicle operating device according to any one of fifteenth to nineteenth aspects is configured so that the base member includes a guide passage configured to guides a cable extending from at least one of the first electrical switch and the second electrical switch, and the guide passage extends over 90° or greater in the first direction.

In accordance with the operating device, the length of the cable laid out in the base member is increased in length. Thus, the cable is less likely to be damaged even in a case where a force capable to bend the cable acts on the outside of the base member.

In accordance with a twenty-first aspect of the present disclosure, the human-powered vehicle operating device according to any one of first to twentieth aspects is configured so that the first electrical switch and the second electrical switch are provided on an electronic substrate.

In accordance with the operating device, the number of components can be reduced.

In accordance with a twenty-second aspect of the present disclosure, in the human-powered vehicle operating device according to any one of first to twenty-first aspects, the base member includes a clamp configured to be attachable to the tubular member of the human-powered vehicle and a cover that at least partially cover the clamp.

In accordance with the operating device, the clamp is protected.

In accordance with a twenty-third aspect of the present disclosure, the human-powered vehicle operating device according to the twenty-second aspect is configured so that the clamp includes a first material, and the cover includes a second material different from the first material.

In accordance with the operating device, any material can be selected in accordance with the performance required for each of the cover and the clamp.

In accordance with a twenty-fourth aspect of the present disclosure, the human-powered vehicle operating device according to the twenty-second or the twenty-third aspect is configured so that the first electrical switch and the second electrical switch are provided on the cover.

In accordance with the operating device, the operating device is reduced in size. This allows the user to easily access each operating member.

In accordance with a twenty-fifth aspect of the present disclosure, in the human-powered vehicle operating device according to the fourteenth aspect, the base member includes a clamp configured to be attached to a tubular member of the human-powered vehicle and a cover that at least partially covers the clamp, and the cover includes a support member supporting the pivot shaft.

In accordance with the operating device, the pivot shaft can be supported.

In accordance with a twenty-sixth aspect of the present disclosure, the human-powered vehicle operating device according to the twenty-fifth aspect is configured so that the support member includes an insertion hole into which the pivot shaft is inserted.

In accordance with the operating device, the pivot shaft can be supported with the insertion hole.

In accordance with a twenty-seventh aspect of the present disclosure, the human-powered vehicle operating device according to the twenty-sixth aspect is configured so that the cover includes a restricting portion that at least partially covers the insertion hole.

In accordance with the operating device, removal of the pivot shaft from the insertion hole is restricted.

In accordance with a twenty-eighth aspect of the present disclosure, the human-powered vehicle operating device according to the twenty-seventh aspect is configured so that the cover includes a first cover and a second cover that are separate members. The first cover includes the support member and a first covering portion that at least partially covers the clamp. The second cover includes the restricting portion.

In accordance with the operating device, removal of the pivot shaft from the insertion hole is restricted.

In accordance with a twenty-ninth aspect of the present disclosure, the human-powered vehicle operating device according to any one of twenty-second to twenty-fourth aspects is configured so that the cover includes a first cover and a second cover formed as separate members.

In accordance with the operating device, attachment of the first cover and the second cover is facilitated.

In accordance with a thirtieth aspect of the present disclosure, the human-powered vehicle operating device according to the twenty-ninth aspect is configured so that at least one of the first cover and the second cover includes a reservoir.

In accordance with the operating device, liquid collected on the cover can be stored.

In accordance with a thirty-first aspect of the present disclosure, the human-powered vehicle operating device according to the thirtieth aspect is configured so that the reservoir is provided on the first cover and being covered by the second cover.

In accordance with the operating device, the liquid adhering on the first cover can be stored.

In accordance with a thirty-second aspect of the present disclosure, the human-powered vehicle operating device according to the thirty-first aspect is configured so that at least one of the first cover and the second cover further includes a discharge outlet configured to discharges liquid from the reservoir to outside of the cover.

In accordance with the operating device, liquid from the reservoir can be discharged to the outside.

In accordance with a thirty-third aspect of the present disclosure, the human-powered vehicle operating device according to the thirty-second aspect is configured so that the first cover includes the discharge outlet and an exposed portion exposed from the second cover, and the discharge outlet includes a discharge passage connecting the reservoir and the exposed portion.

In accordance with the operating device, the liquid can be easily stored in the reservoir.

In accordance with a thirty-fourth aspect of the present disclosure, the human-powered vehicle operating device according to any one of twenty-ninth to thirty-third aspect is configured so that the first cover includes a first covering portion that at least partially covers the clamp.

In accordance with the operating device, the clamp is protected.

In accordance with a thirty-fifth aspect of the present disclosure, the human-powered vehicle operating device according to any one of twenty-ninth to thirty-fourth aspects is configured so that the second cover includes a second covering portion that at least partially covers the first cover.

In accordance with the operating device, the first cover is protected.

In accordance with a thirty-sixth aspect of the present disclosure, in the human-powered vehicle operating device according to the thirty-fifth aspect, the second covering portion at least partially covers the clamp.

In accordance with the operating device, the clamp is protected.

In accordance with a thirty-seventh aspect of the present disclosure, the human-powered vehicle operating device according to any one of twenty-eighth to thirty-sixth aspects is configured so that the cover further includes an engagement portion that engages the first cover and the second cover.

In accordance with the operating device, the user can easily combine the first cover and the second cover.

In accordance with a thirty-eighth aspect of the present disclosure, the human-powered vehicle operating device according to the thirty-seventh aspect is configured so that the engagement portion includes a protrusion provided on one of the first cover and the second cover and a recess provided on the other of the first cover and the second cover.

In accordance with the operating device, the user can easily combine the first cover and the second cover.

In accordance with a thirty-ninth aspect of the present disclosure, the human-powered vehicle operating device according to the thirty-eighth aspect is configured so that the first cover includes the protrusion and an inner circumferential surface facing an outer circumferential surface of the clamp, the second cover includes the recess, and the protrusion is provided between the inner circumferential surface and the recess.

In accordance with the operating device, separation of the first cover and the second cover can be prevented when attached to the tubular member by the clamp.

In accordance with a fortieth aspect of the present disclosure, the human-powered vehicle operating device according to any one of twenty-second to twenty-fourth aspects is configured so that the cover includes a reservoir.

In accordance with the operating device, the liquid adhering on the cover can be stored in the reservoir.

In accordance with a forty-first aspect of the present disclosure, the human-powered vehicle operating device according to any one of thirtieth to thirty-third is configured so that and the fortieth aspects, the reservoir includes a recess opening on a side surface of the cover.

In accordance with the operating device, the liquid adhering on the cover can be easily stored in the reservoir.

The human-powered vehicle operating device of the present disclosure can easily be accessed by the user.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

An operating device 10 for a human-powered vehicle in accordance with the present embodiment will now be described with reference to FIGS. 1 to 7. The operating device 10 is attached to a predetermined subject member provided on a human-powered vehicle B (refer to FIG. 7). One example of the predetermined subject member is a tubular member 12. One example of the tubular member 12 is a handlebar or a frame configuring the main body of the human-powered vehicle B. The tubular member 12 illustrated in FIGS. 1, 3, 5, and 7 is a handlebar.

Figure 7:
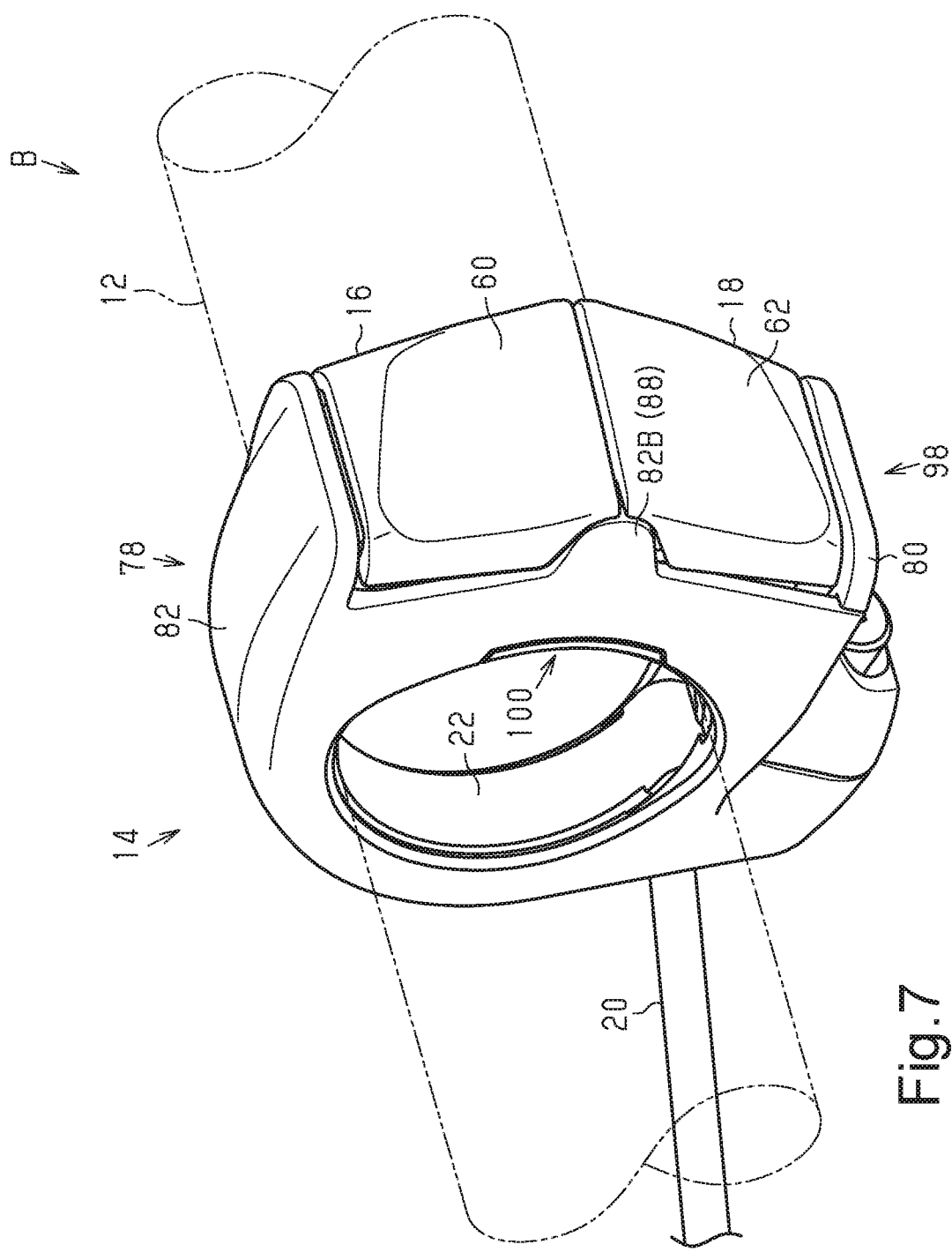
FIG. 7 is a perspective view of a human-powered vehicle operating device in accordance with a second embodiment attached to a tubular member.
Figure 8:
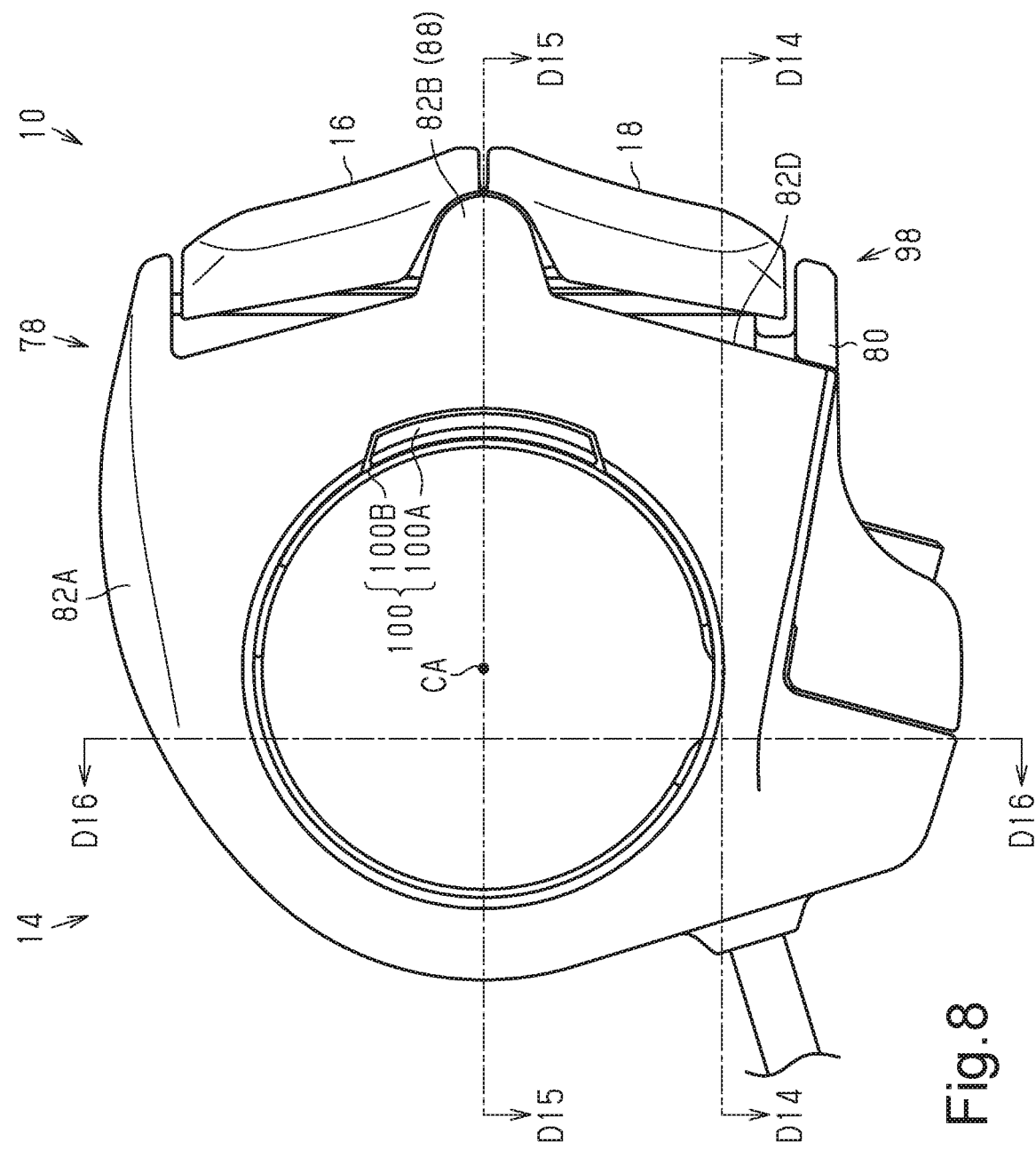
FIG. 8 is a side view of the human-powered vehicle operating device illustrated in FIG. 7.

The human-powered vehicle B refers to a vehicle that at least partially uses human force as a driving means for traveling and includes vehicles that assist human force with electric force. A vehicle that does not include human force as a driving means is not referred to as the human-powered vehicle B. For example, a vehicle using only an internal combustion engine as the driving means to generate force is not referred to as the human-powered vehicle B. A typical example of a human-powered vehicle B is a compact light vehicle that does not require a license to drive on a public road. Examples of a compact light vehicle include a bicycle and a kick scooter. The bicycle can be of any type. Examples of a bicycle include a city cycle, a road bike, a mountain bike, a trekking bike, a cross bike, a cargo bike, and a recumbent bike. The type of human-powered vehicle B illustrated in FIG. 7 is a mountain bike.

Figure 1:
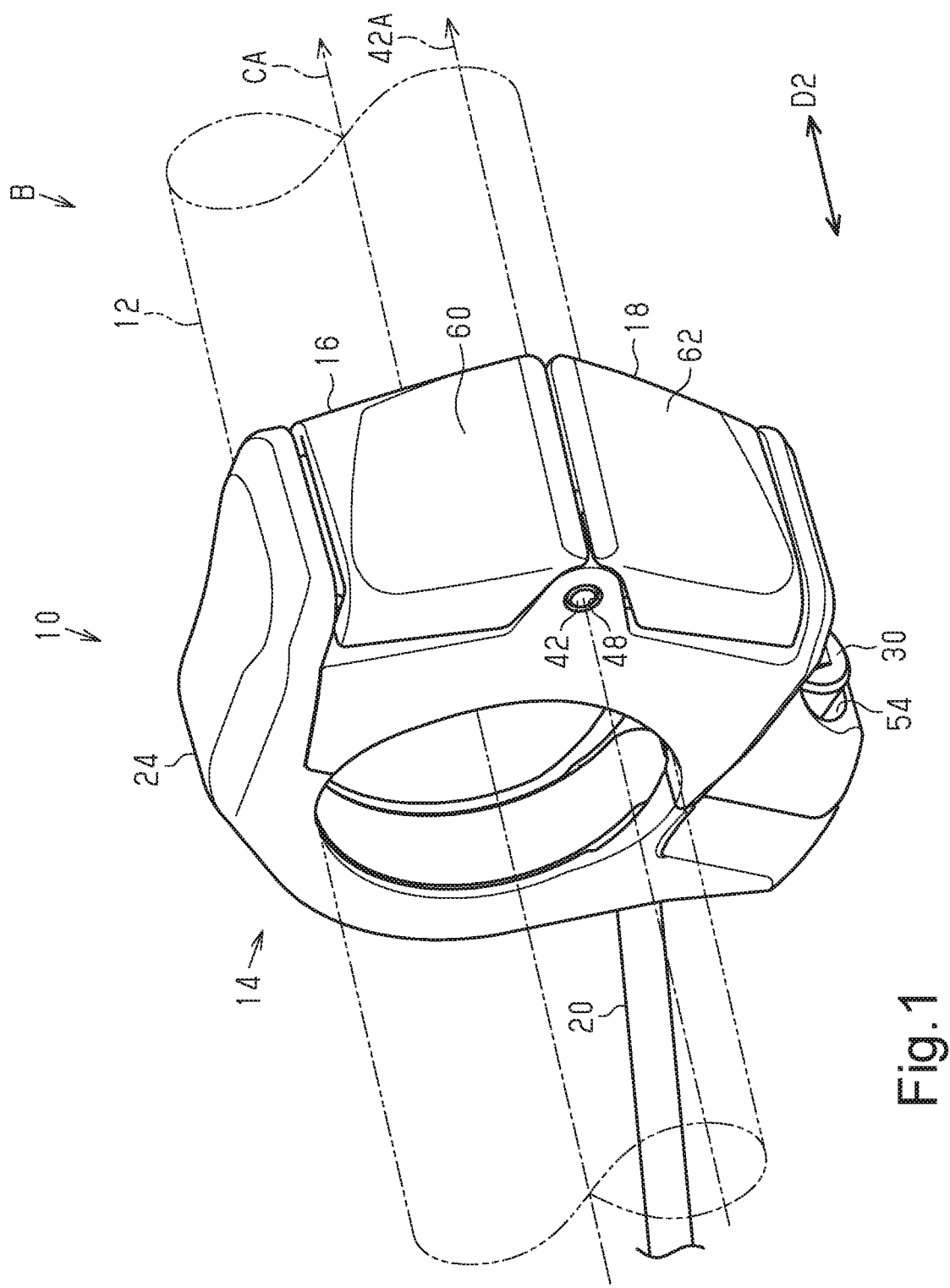
FIG. 1 is a perspective view of a human-powered vehicle operating device in accordance with a first embodiment attached to a tubular member.

As shown in FIG. 1, the operating device 10 includes a base member 14, a first operating member 16, and a second operating member 18. The base member 14 is configured to be attached to the tubular member 12 of the human-powered vehicle B. The operating device 10 is connected to a component of the human-powered vehicle B by a cable 20. One example of a component is an assist operating device, a transmission operating device, a seatpost operating device, a brake operating device, and a suspension operating device.

Figure 2:
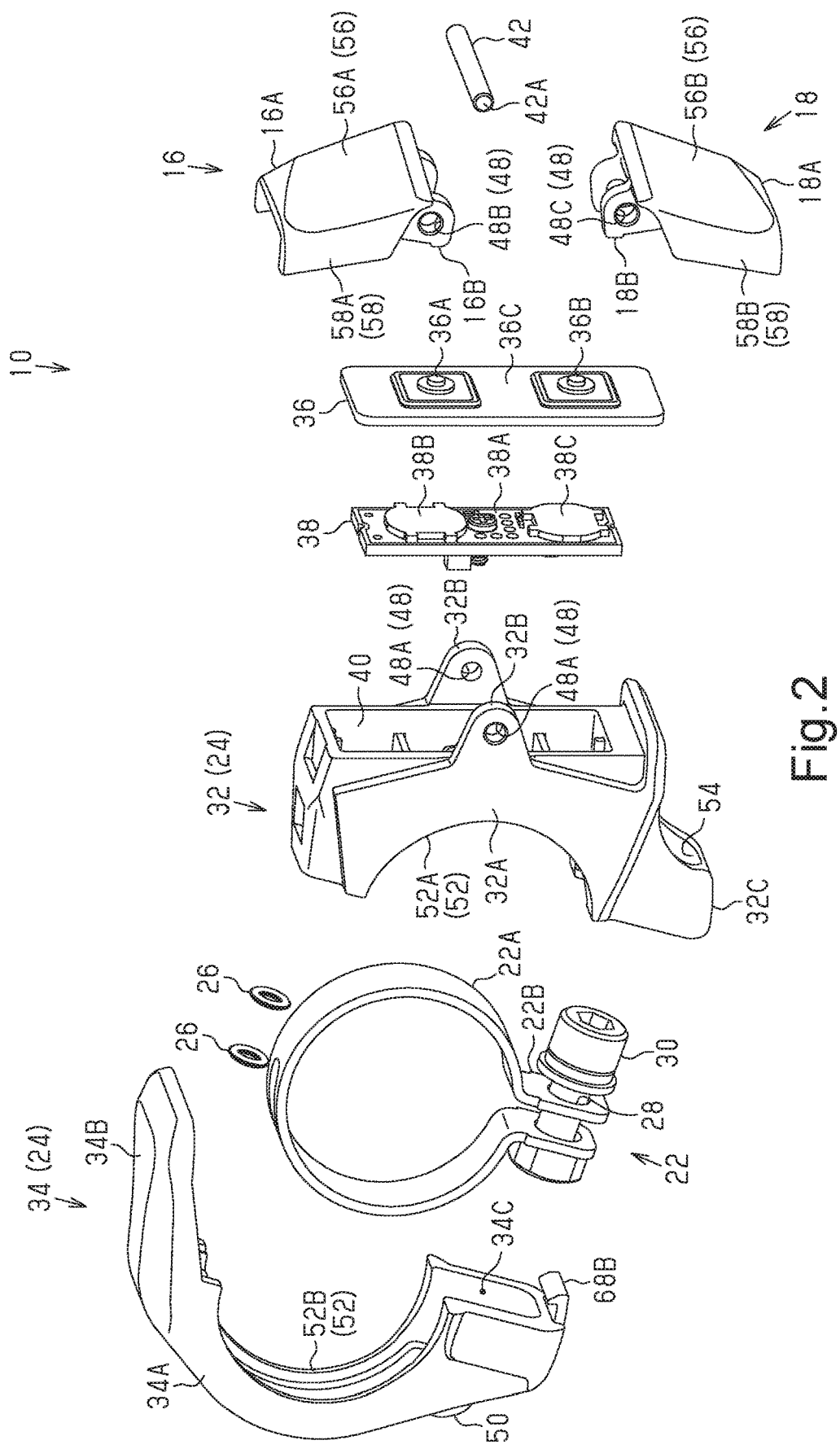
FIG. 2 is an exploded view of the human-powered vehicle operating device illustrated in FIG. 1.
Figure 6:
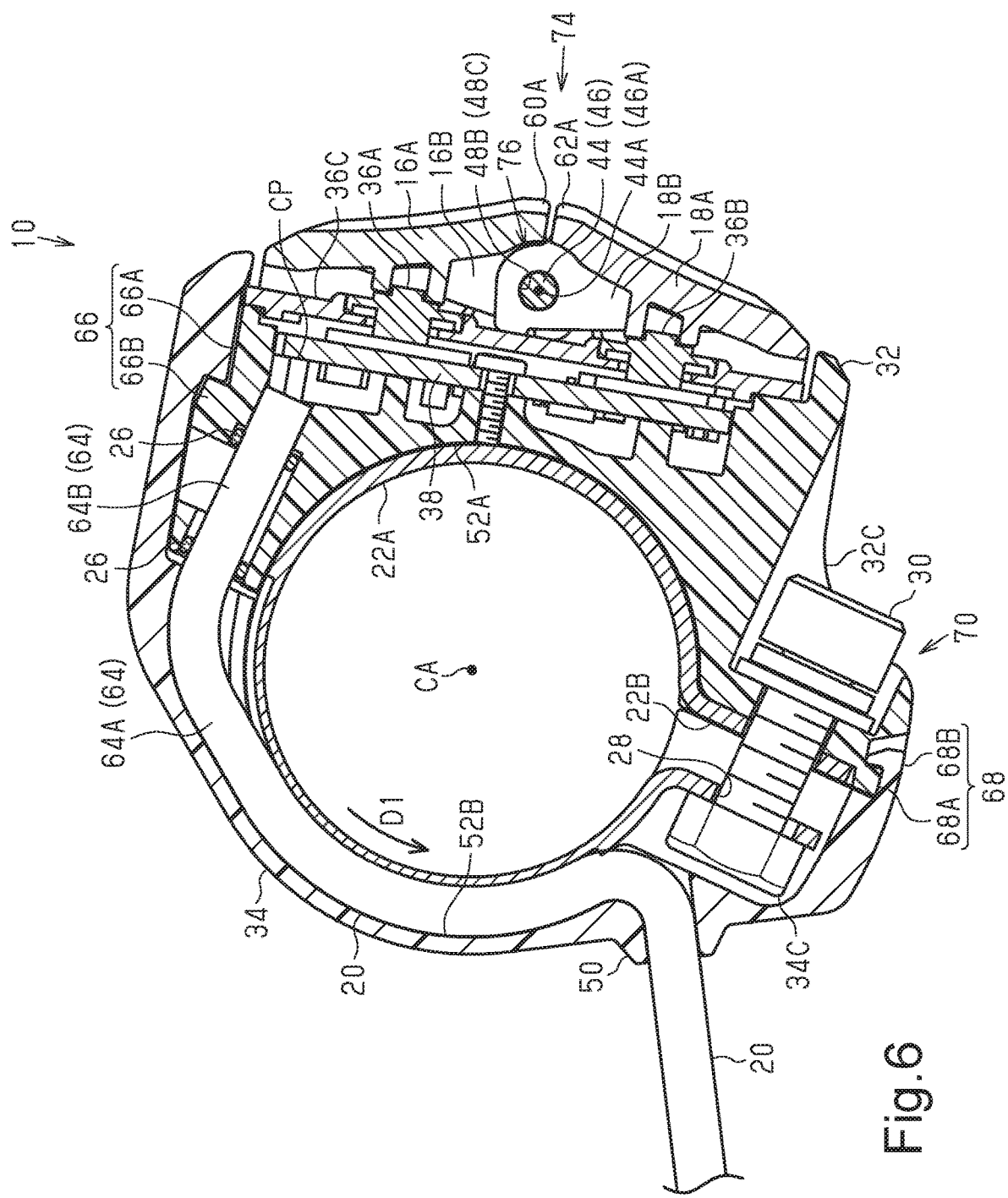
FIG. 6 is a cross-sectional view of the human-powered vehicle operating device illustrated in FIG. 1.

As shown in FIGS. 2 and 6, the base member 14 includes a clamp 22 and a cover 24. The clamp 22 is configured to be attachable to the tubular member 12 of the human-powered vehicle B. The clamp 22 includes an arcuate portion 22A and a pair of flat plate portions 22B. The clamp 22 is shaped to be symmetric with respect to a symmetry axis that is orthogonal to a center axis CA of the clamp 22. Each flat plate portion 22B extends from one end of the arcuate portion 22A. The tubular member 12 is inserted into the arcuate portion 22A. The arcuate portion 22A is configured to contact the tubular member 12. Each flat plate portion 22B includes an insertion hole 28. A bolt 30 is inserted through the insertion hole 28. The bolt 30 attaches the clamp 22 to the tubular member 12. The clamp 22 includes a first material. One example of the first material is a metal.

The cover 24 at least partially covers the clamp 22. In the present embodiment, the cover 24 entirely covers the clamp 22. The cover 24 includes a first cover 32 and a second cover 34. The first cover 32 covers substantially one-half of the clamp 22 at one side of the symmetry axis. The second cover 34 covers substantially one-half of the clamp 22 at the other side of the symmetry axis. The cover 24 includes a second material different from the first material. One example of the second material is a resin. In a preferred example, the second material is a thermoplastic resin. The cover 24 further includes a bolt holder 70. The bolt 30 is accommodated in the bolt holder 70. The user can adjust a tightening force of the clamp 22 by rotating the bolt 30. The bolt holder 70 includes a first bolt holder 32C and a second bolt holder 34C.

The first cover 32 includes a main body 32A, projections 32B, and the first bolt holder 32C. The main body 32A includes a first groove portion 52A of a groove 52. The first groove portion 52A covers the arcuate portion 22A of the clamp 22. The main body 32A further includes an opening 40. An electronic circuit 38 is embedded and held in the opening 40. Each of the projections 32B projects in the direction in which the opening 40 opens. Each of the projections 32B includes a shaft hole 48A. The first bolt holder 32C includes an insertion hole 54. The insertion hole 54 accommodates the bolt 30 attached to the clamp 22.

The second cover 34 includes a main body 34A, an extension 34B, and the second bolt holder 34C. The main body 34A includes a second groove portion 52B of the groove 52. The second groove portion 52B covers the arcuate portion 22A of the clamp 22. The extension 34B covers part of the first cover 32. The second bolt holder 34C accommodates the bolt 30 attached to the clamp 22. The second cover 34 further includes a guide hole 50. The guide hole 50 guides the cable 20 into and out of the base member 14.

The electronic circuit 38 includes an electronic substrate 38A, a first contact portion 38B, and a second contact portion 38C. The first contact portion 38B and the second contact portion 38C are arranged on one surface of the electronic substrate 38A. A switch member 36 is arranged to overlap with one surface of the circuit 38. The switch member 36 includes a first electrical switch 36A, a second electrical switch 36B, and a plate member 36C. The first electrical switch 36A is arranged on one surface of the plate member 36C. The second electrical switch 36B is arranged on the one surface of the plate member 36C. The first electrical switch 36A is arranged in a direction perpendicular to the first contact portion 38B. The second electrical switch 36B is arranged in a direction perpendicular to the second contact portion 38C. The first electrical switch 36A and the second electrical switch 36B are provided on the first cover 32. In one example, the first electrical switch 36A and the second electrical switch 36B are provided on the first cover 32 with the electronic circuit 38 located in between. The first electrical switch 36A and the second electrical switch 36B are provided on the same electronic substrate 38A.

The first operating member 16 includes a main body 16A and projections 16B. The main body 16A includes a first main wall 56A and a first side wall 58A. The first operating member 16 is arranged to overlap with the switch member 36. The first operating member 16 is arranged in a direction perpendicular to the first electrical switch 36A. The first electrical switch 36A is arranged between the base member 14 and the first operating member 16.

The second operating member 18 includes a main body 18A and projections 18B. The main body 18A includes a second main wall 56B and a second side wall 58B. The second operating member 18 is arranged to overlap with the switch member 36. The second operating member 18 is arranged in a direction perpendicular to the second electrical switch 36B. The second electrical switch 36B is arranged between the base member 14 and the second operating member 18.

Figure 4:
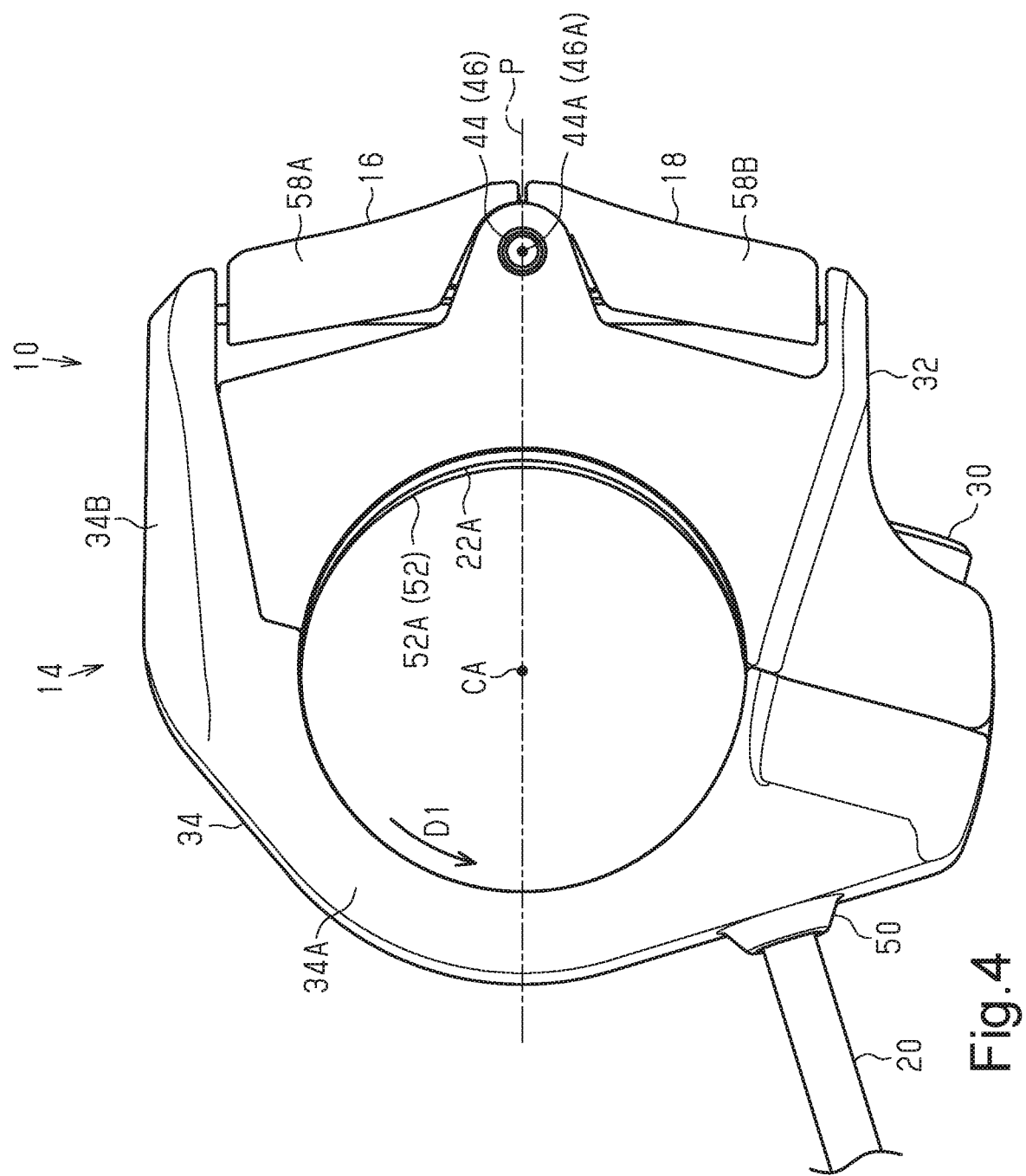
FIG. 4 is a side view of the human-powered vehicle operating device illustrated in FIG. 1.

As shown in FIGS. 2 and 6, each of the projections 32B of the first cover 32 includes a shaft hole 48A through which a pivot shaft 42 is inserted. Each of the projections 16B of the first operating member 16 includes a shaft hole 48B through which a first shaft 44 is inserted. Each of the projections 18B of the second operating member 18 includes a shaft hole 48C through which a second shaft 46 is inserted. The center axis of the shaft holes 48A, the center axis of the shaft holes 48B, and the center axis of the shaft holes 48C are coaxial. The first shaft 44 attaches the first operating member 16 and the first cover 32. The second shaft 46 attaches the second operating member 18 and the first cover 32. The first operating member 16 is configured to pivot about a first axis 44A with respect to the base member 14. The second operating member 18 is configured to pivot about a second axis 46A with respect to the base member 14. The first operating member 16 and the second operating member 18 are configured to pivot independent from each other. In one example, a distance between the shaft holes 48A of the projections 32B is longer than a distance between the shaft holes 48B of the projections 16B and a distance between the shaft holes 48C of the projections 18B. The distance between the shaft holes 48B of the projections 16B is longer than the distance between the shaft holes 48C of the projections 18B. Shaft holes 48 are comprised of the shaft holes 48A, the shaft holes 48B, and the shaft holes 48C. The pivot shaft 42 is inserted into the shaft hole 48. The first axis 44A and the second axis 46A are defined along the pivot shaft 42. The first axis 44A and the second axis 46A are coaxial with the axis 42A of the pivot shaft 42. The first operating member 16 and the second operating member 18 are arranged next to each other in a first direction D1. The first axis 44A and the second axis 46A are extended along a second direction D2. The first direction D1 can be set to any direction. One example of the first direction D1 is a direction that is the same as the second direction D2, a direction that intersects the second direction D2, a direction extending in the same direction as the symmetry axis of the clamp 22, a predetermined direction extending along a predetermined plane lying along the second direction D2 and the symmetry axis of the clamp 22, and a circumferential direction of the tubular member 12. As shown in FIG. 4, in the present embodiment, the first direction D1 extends in the circumferential direction of the tubular member 12. The first direction D1 if projected on a predetermined plane will be a straight line. The first direction D1 and the second direction D2 if projected on a predetermined plane are orthogonal to each other. The predetermined plane corresponds to a plane in a view of the operating device 10 taken in a direction orthogonal to the first direction D1 and the second direction D2.

The first electrical switch 36A is activated by pivoting the first operating member 16. The substrate 38A transmits activation of the first electrical switch 36A to the component of the human-powered vehicle B through a connected cable 20. The first electrical switch 36A includes an elastic member. The elastic member keeps the first operating member 16 and the first electrical switch 36A separated as long as the first operating member 16 is not pivoted. One example of an elastic member is a rubber member or a spring.

The second electrical switch 36B is activated by pivoting the second operating member 18. The electronic substrate 38A transmits activation of the second electrical switch 36B to the component of the human-powered vehicle B through the connected cable 20. The second electrical switch 36B includes an elastic member. The elastic member keeps the second operating member 18 and the second electrical switch 36B separated as long as the second operating member 18 is not pivoted. One example of an elastic member is a rubber member or a spring.

The center axis CA of the clamp 22 is parallel to the pivot shaft 42. The center axis CA of the clamp lies in the second direction D2.

Figure 3:
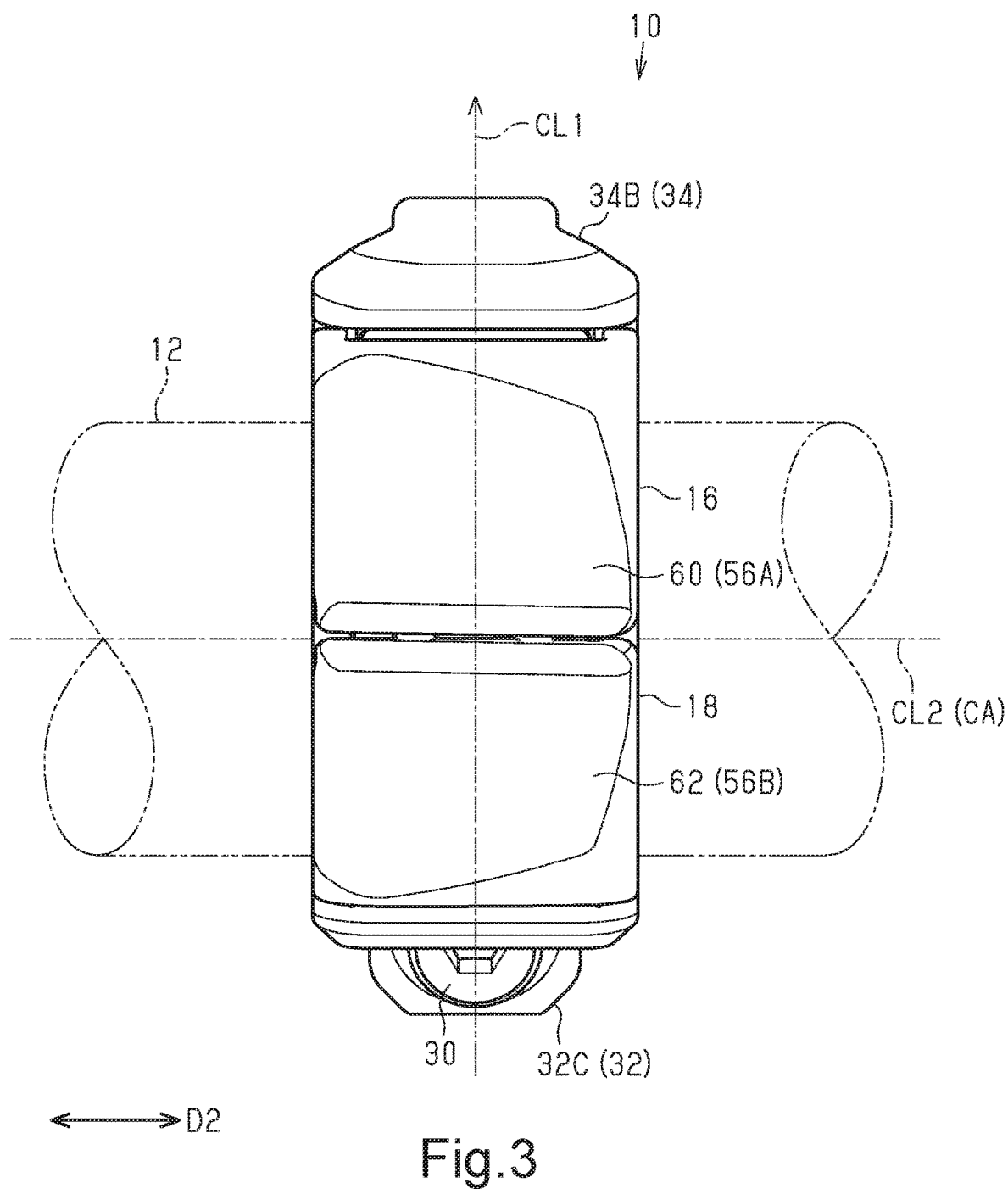
FIG. 3 is a front view of the human-powered vehicle operating device illustrated in FIG. 1.

As shown in FIGS. 2 to 4, the first operating member 16 includes the first main wall 56A and the first side wall 58A. The first operating member 16 is an interface for operating the operating device 10. The first main wall 56A has a first operating surface 60. The first operating surface 60 is pushed by the user. In a view taken in a direction orthogonal to the first direction D1 and the second direction D2, the first operating surface 60 is asymmetric with respect to a center line CL1 extending in the first direction D1 of the first operating surface 60. The first operating surface 60 is formed to increase in area from one side to another side in the second direction D2. The first direction D1 corresponding to the center line CL1 is the first direction D1 projected on a predetermined plane. In the example shown in FIG. 3, in a view taken in a direction orthogonal to the first direction D1 and the second direction D2, the first operating surface 60 is increased in area from one side to another side in the second direction D2. The first operating surface 60 has a width at one end in the first direction D1 of, for example, 15 mm. Furthermore, the first operating surface 60 has a width at the other end in the first direction D1 of, for example, 25 mm.

The first operating surface 60 is inclined toward the base member 14 from one side to another side in the second direction D2. In one example, the first operating surface 60 is inclined by 6°. In the example shown in FIG. 3, the first operating surface 60 is inclined toward the base member 14 from the right side to the left side. As shown in FIG. 4, the first operating surface 60 is inclined toward the base member 14 as the first operating surface 60 becomes farther from the first axis 44A.

As shown in FIGS. 2 to 4, the second operating member 18 includes a second main wall 56B and a second side wall 58B. The second operating member 18 is an interface for operating the operating device 10. The second main wall 56B has a second operating surface 62. The second operating surface 62 is pushed by the user. In a view taken in a direction orthogonal to the first direction D1 and the second direction D2, the second operating surface 62 is asymmetric with respect to the center line CL1 extending in the first direction D1. The second operating surface 62 is increased in area from one side to another side in the second direction D2. In the example shown in FIG. 3, in a view taken in a direction orthogonal to the first direction D1 and the second direction D2, the second operating surface 62 is increased in area from one side to another side in the second direction D2. The second operating surface 62 has a width at one end in the first direction D1 of, for example, 15 mm. Further, the second operating surface 62 has a width at the other end in the first direction D1 of, for example, 25 mm.

The second operating surface 62 is inclined toward the base member 14 from one side to another side in the second direction D2. In one example, the first operating surface 60 is inclined by 6°. In the example shown in FIG. 3, the second operating surface 62 is inclined toward the base member 14 from the right side to the left side. As shown in FIG. 4, the second operating surface 62 is inclined toward the base member 14 as the second operating surface 62 becomes farther from the second axis 46A.

As shown in FIG. 3, in a view taken in a direction orthogonal to the first direction D1 and the second direction D2, the first operating surface 60 and the second operating surface 62 are line-symmetric to each other with respect to the first axis 44A and the second axis 46A. Specifically, the first operating surface 60 and the second operating surface 62 are line-symmetric with respect to a center line CL2 parallel to the second direction D2. The center axis CA of the clamp 22 coincides with the center line CL2 as the operating device 10 in a view taken from a direction orthogonal to the first direction D1 and the second direction D2.

As shown in FIGS. 1 and 4, the pivot shaft 42 is parallel to the center axis CA in the second direction D2. The first operating member 16 and the second operating member 18 are symmetric to each other with respect to the plane P in a view taken in a direction parallel to the pivot shaft 42 and the center axis CA of the clamp. The plane P is parallel to the second direction D2 and includes the pivot shaft 42 and the center axis CA of the clamp. In a view of the operating device 10 taken from a direction orthogonal to the first direction D1 and the second direction D2, the plane P coincides with the center line CL2.

Figure 5:
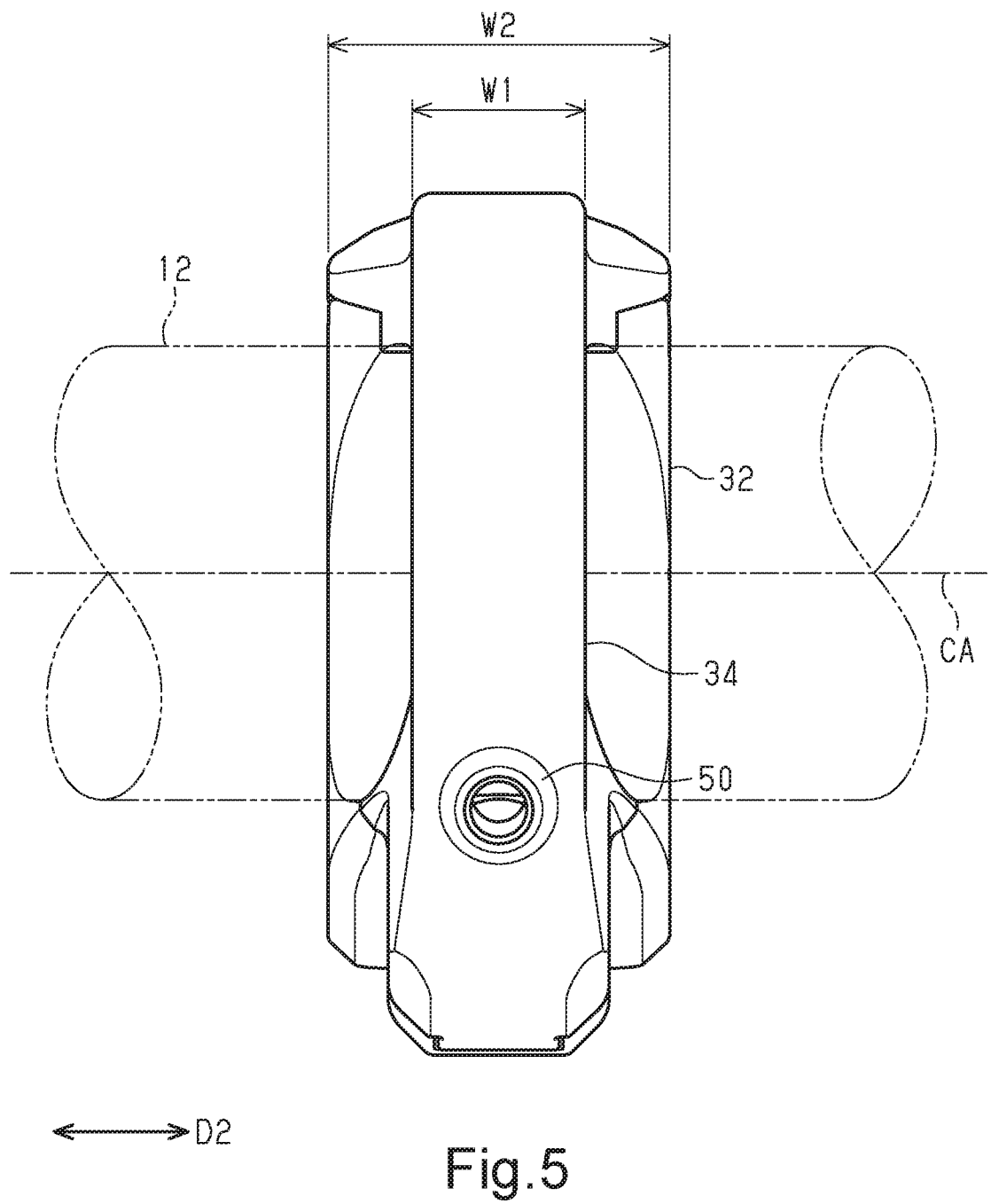
FIG. 5 is a rear view of the human-powered vehicle operating device illustrated in FIG. 1.

As shown in FIG. 5, the dimension of the base member 14 in the axial direction of the tubular member 12 is smaller than that of the first operating member 16 or the second operating member 18. In the illustrated example, the axial dimension of the tubular member 12 corresponds to a dimension W1 in the second direction D2. The axial dimensions of the first operating member 16 and the second operating member 18 correspond to a dimension W2 in the second direction D2. In one example, the dimension W1 of the base member 14 in the second direction D2 is larger than or equal to 5 mm and smaller than or equal to 30 mm. The minimum value of the dimension W1 is 5 mm. In one example, the dimension W1 is 6 mm. Preferably, the dimension W1 of the base member 14 in the second direction D2 is set to smaller than or equal to 30 mm. In one example, the dimension W1 of the base member 14 in the second direction D2 is 17 mm. One example of the dimension W2 is 18 mm.

As shown in FIG. 6, the operating device 10 further includes a non-operable portion 74. The non-operable portion 74 extends across the first operating member 16 and the second operating member 18. The non-operable portion 74 includes a hinge 76, an end 60A corresponding to the projections 16B of the first operating surface 60, and an end 62A corresponding to the projections 18B of the second operating surface 62. The hinge 76 includes the projections 16B of the first operating member 16, the projections 18B of the second operating member 18, the projections 32B of the first cover 32, and the pivot shaft 42. In one example, the ends 60A and 62A are not inclined toward the base member 14 or are inclined at a degree that is more gradual than other portions of the operating surfaces 60 and 62.

In a case where the end 60A of the first operating surface 60 is pushed, the first operating member 16 is not pivoted toward the first electrical switch 36A. Therefore, the first electrical switch 36A does not move. In a case where the end 62A of the second operating surface 62 is pushed, the second operating member 18 is not pivoted toward the second electrical switch 36B. Therefore, the second electrical switch 36B does not move. In a case where the end 60A of the first operating surface 60 and the end 62A of the second operating surface 62 are both pushed, the operating members 16 and 18 do not pivot toward the switch member 36. Therefore, the switch member 36 does not move. This limits misoperation since the switch member 36 will not move in a case where the user simultaneously pushes the end 60A of the first operating surface 60 and the end 60A of the second operating surface 62 with a finger.

As shown in FIG. 6, the base member 14 includes a guide passage 64 that guides the cable 20 extending from at least one of the first electrical switch 36A and the second electrical switch 36B. In one example, the first electrical switch 36A and the cable 20 are connected at a connecting portion CP. The inner diameter of the guide passage 64 is larger than the outer diameter of the cable 20. The guide passage 64 includes a first guide passage 64A and a second guide passage 64B. The first guide passage 64A extends in the first direction D1 of the tubular member 12. The distance from the connecting portion CP to a guide hole 50 is set to be greater than or equal to the length of an arc in which the center angle of the tubular member 12 is 90°. The first guide passage 64A extends greater than or equal to 90° in the circumferential direction of the tubular member 12. In one example, the first guide passage 64A is formed over a range of 180°.

The second guide passage 64B is substantially straight. The second guide passage 64B includes guide rings 26. The guide rings 26 guides the cable 20. The cable 20 connected to the connecting portion CP passes through the second guide passage 64B and the first guide passage 64A and extends out of the guide hole 50 of the second cover 34.

The first cover 32 and the second cover 34 are engaged at a first engaging portion 66 and a second engaging portion 68. The first engaging portion 66 includes a first hook 66A and a second hook 66B. The first hook 66A is provided on the first cover 32. The second hook 66B is provided on the second cover 34. The first hook 66A and the second hook 66B are engaged with each other. The second engaging portion 68 includes a third hook 68A and a fourth hook 68B. The third hook 68A is provided on the first cover 32. The fourth hook 68B is provided on the second cover 34. The third hook 68A and the fourth hook 68B are engaged with each other. The first engaging portion 66 and the second engaging portion 68 have water resistant properties.

The inner diameter of the arcuate portion 22A of the clamp 22 is larger than the outer diameter of the tubular member 12. This allows the arcuate portion 22A of the clamp 22 to be passed from the end of the tubular member 12. The operating device 10 is attached to the tubular member 12 by, for example, first fitting the arcuate portion 22A of the clamp 22 to the end of the tubular member 12. Next, the operating device 10 is arranged at a predetermined position on the tubular member 12. Then, the bolt 30 is tightened. This fixes the clamp 22 to the tubular member 12.

Second Embodiment

The human-powered vehicle operating device 10 in accordance with the second embodiment will now be described with reference to FIGS. 7 to 16. Same reference numerals are given to those components that are the same as the corresponding components of the first embodiment. Such components will not be described in detail.

As shown in FIGS. 7 to 11, the base member 14 includes the clamp 22, configured to be attached to the tubular member 12 of the human-powered vehicle B, and a cover 78, at least partially covering the clamp 22. The cover 78 includes supports 84 that support the pivot shaft 42. The cover 78 covers the arcuate portion 22A of the clamp 22. The cover 78 includes a first cover 80 and a second cover 82 that are separate members.

Figure 13:
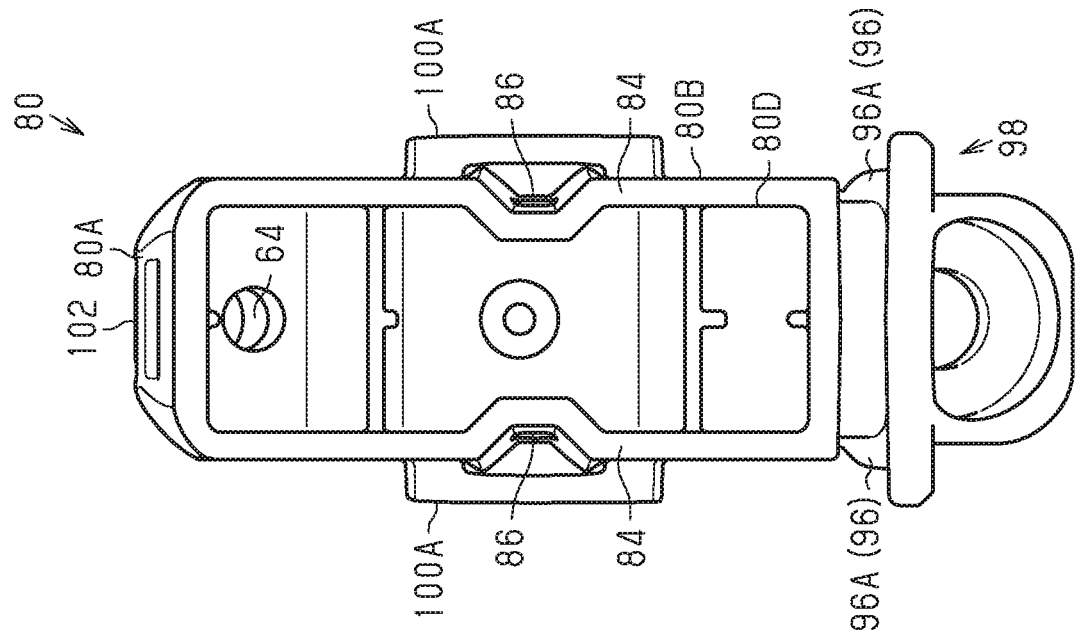
FIG. 13 is a front view of the first cover of the operating device of the second embodiment.
Figure 12:
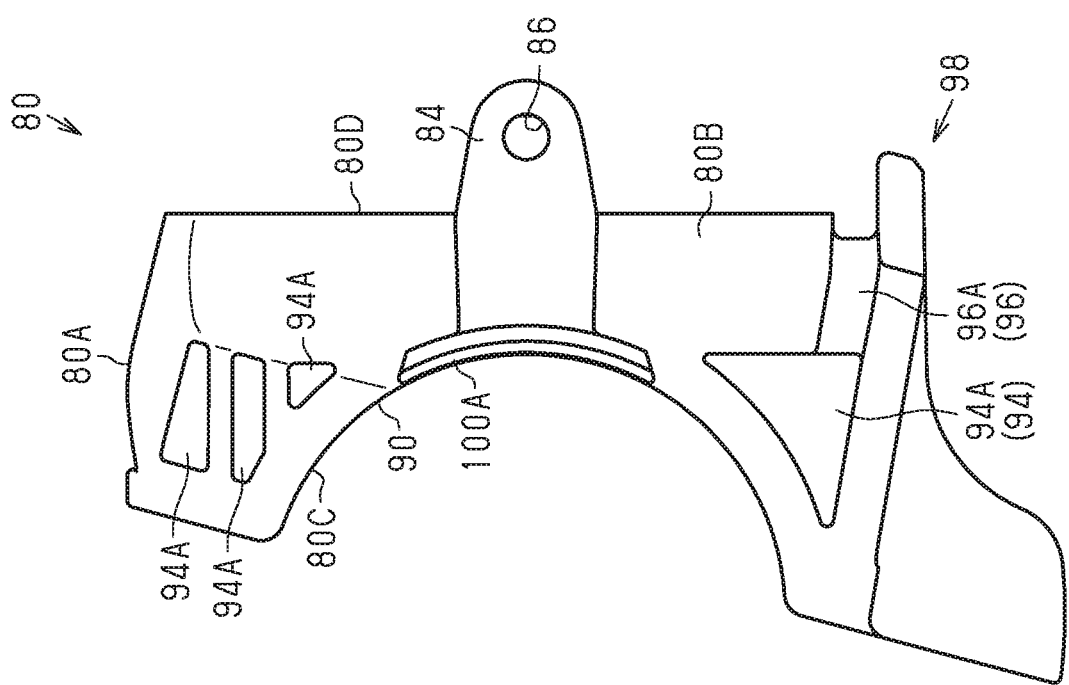
FIG. 12 is a side view of a first cover of the operating device of the second embodiment.

As shown in FIGS. 12 and 13, the first cover 80 includes an upper surface 80A, a side surface 80B, an inner circumferential surface 80C, and an opening 80D. The upper surface 80A includes an opening 102. The side surface 80B includes the supports 84 projecting in the direction in which the opening 80D opens. The supports 84 each include an insertion hole 86 into which the pivot shaft 42 is inserted. The inner circumferential surface 80C includes a first covering portion 90 that at least partially covers the clamp 22. The opening 80D holds the switch member 36 and the circuit 38. The first cover 80 serves as an inner cover.

As illustrated in FIGS. 7, 8, 10, and 11, the second cover 82 includes a main body 82A, projections 82B, an inner circumferential surface 82C, and an opening 82D. The main body 82A includes a second covering portion 92 that at least partially covers the first cover 80. The second covering portion 92 at least partially covers the clamp 22. Each of the projections 82B includes a restricting portion 88 that at least partially covers the corresponding insertion hole 86. The inner circumferential surface 82C is configured to contact the tubular member 12 of the human-powered vehicle B. The opening 82D accommodates the first cover 80. The second cover 82 serves as an outer cover.

The supports 84 extend from the side surface 80B of the first cover 80. The insertion holes 86 of the supports 84 support two ends 42B of the pivot shaft 42. The restricting portions 88 entirely cover and conceal both ends 42B of the pivot shaft 42 and the insertion holes 86.

Figure 9:
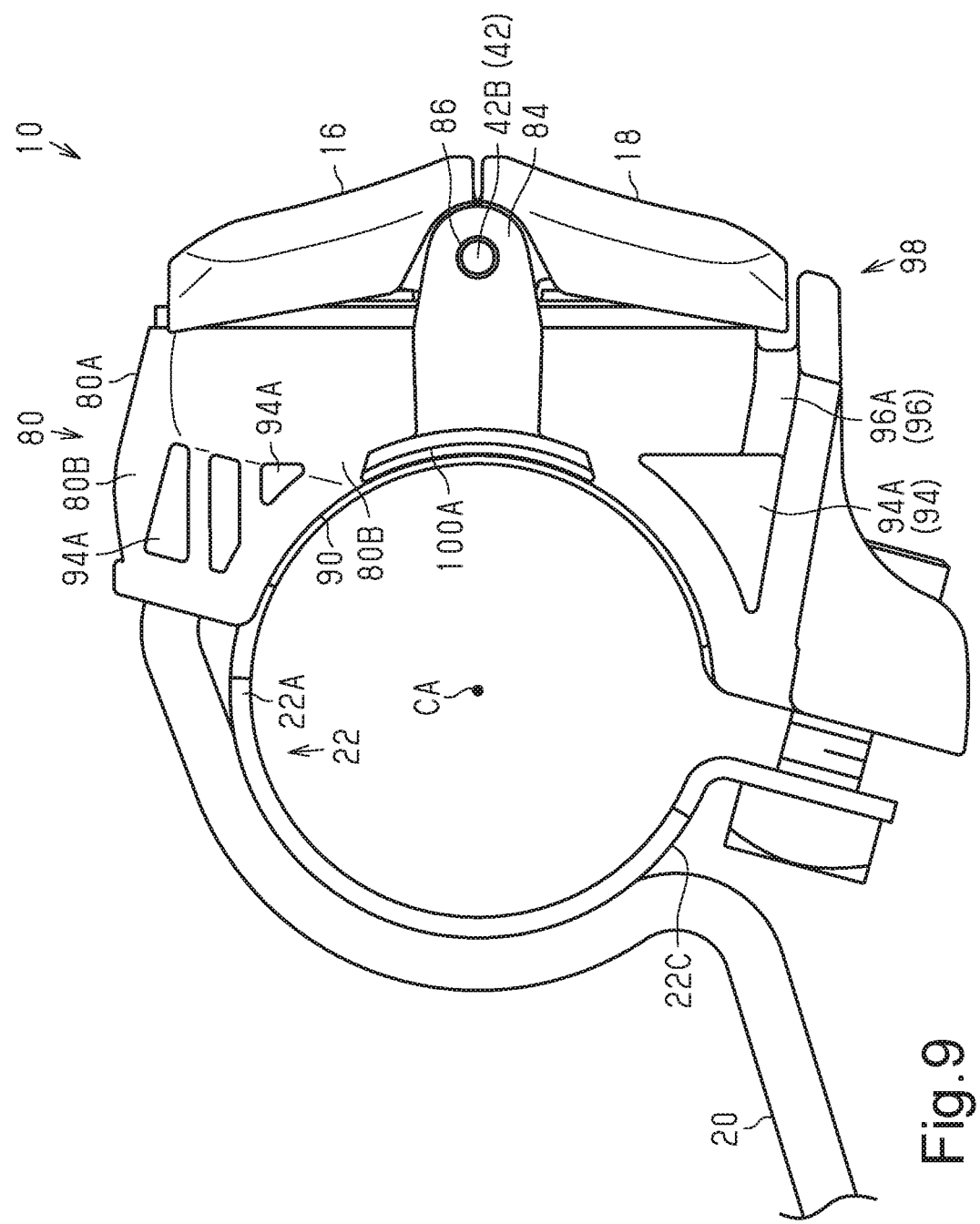
FIG. 9 is a side view of the human-powered vehicle operating device illustrated in FIG. 7 without a second cover.
Figure 10:
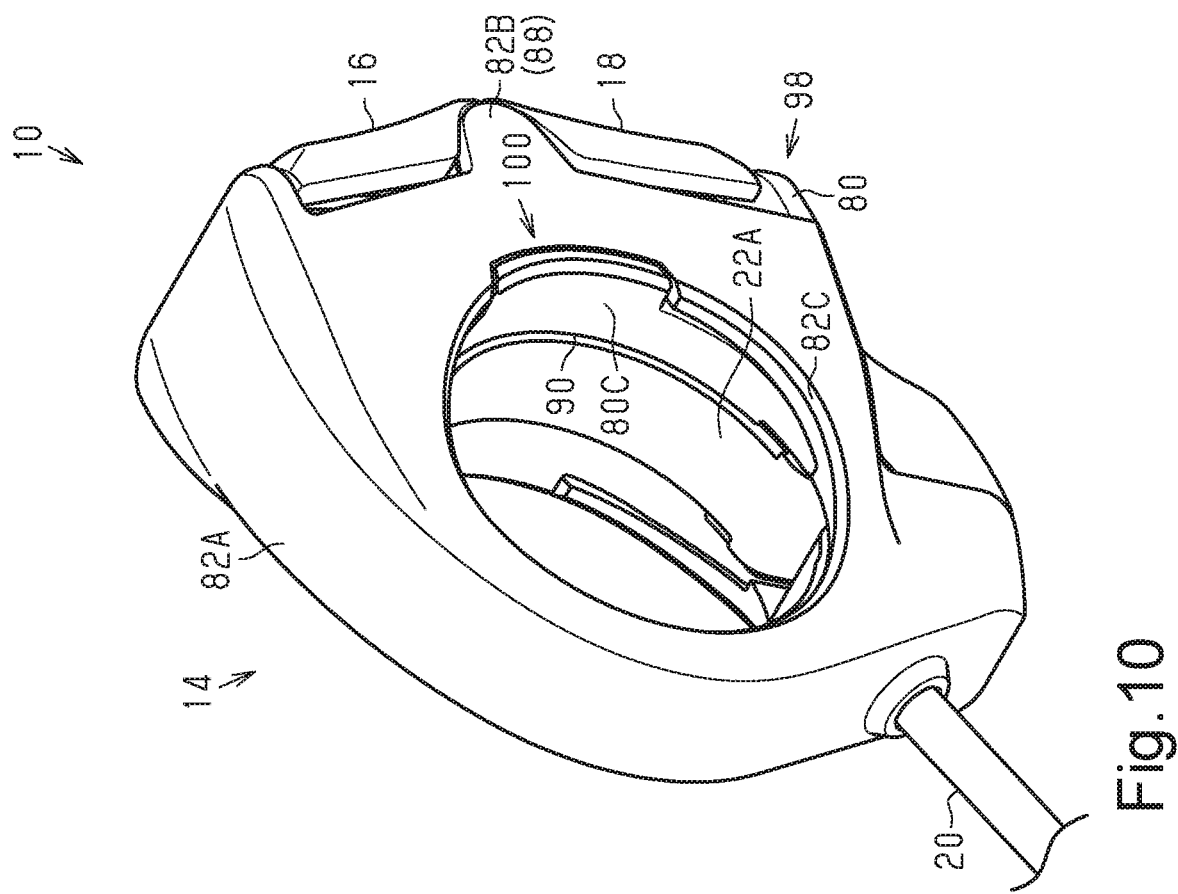
FIG. 10 is a perspective view of the human-powered vehicle operating device illustrated in FIG. 7.

As shown in FIG. 9, the first covering portion 90 covers at least an outer circumferential surface 22C of the arcuate portion 22A of the clamp 22. The operating device 10 is configured so as to be used in the state shown in FIG. 9. As shown in FIGS. 9 and 10, the second covering portion 92 covers parts of the first cover 80 excluding an exposed portion 98. The second covering portion 92 further covers the outer circumferential surface 22C of the arcuate portion 22A of the clamp 22 that is not covered by the first covering portion 90.

The cover 78 includes a reservoir 94. The reservoir 94 includes recesses 94A that open in the side surface of the cover 78. At least one of the first cover 80 and the second cover 82 includes the reservoir 94. At least one of the first cover 80 and the second cover 82 further includes a discharge outlet 96 that discharges liquid from the reservoir 94 to outside of the cover 78.

Figure 14:
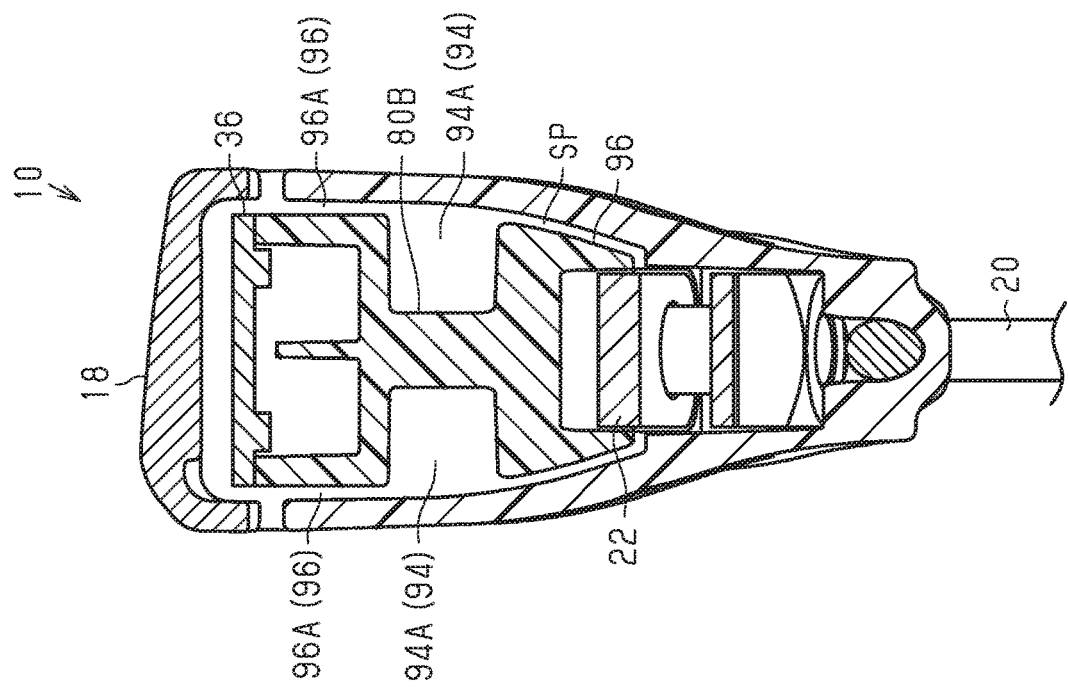
FIG. 14 is a cross-sectional view taken along line D14-D14 of the operating device illustrated in FIG. 8.

As shown in FIGS. 12 to 14, the reservoir 94 is provided on the first cover 80. The reservoir 94 is covered by the second cover 82. A plurality of reservoirs 94 are formed in the side surface 80B of the first cover 80. The main body 82A of the second cover 82 entirely covers the reservoir 94. The recesses 94A of the reservoir 94 are configured to store the liquid adhering on the first cover 80.

The first cover 80 includes the discharge outlet 96 and the exposed portion 98, which is exposed from the second cover 82. The discharge outlet 96 includes a discharge passage 96A connecting the reservoir 94 and the exposed portion 98.

Liquid existing in the environment adheres on the exposed portion 98. One example of liquid is water. More specifically, the liquid may be rainwater if it rains as the human-powered vehicle B travels. The liquid adhered on the exposed portion 98 passes through the discharge passage 96A and is held in the recesses 94A of the reservoir 94. A plurality of discharge passages 96A are provided on the side surface 80B of the first cover 80.

The side surface 80B of the first cover 80 is inclined relative to the vertical direction. A gap SP is formed between the side surface 80B and the main body 82A of the second cover 82. The gap SP includes the discharge outlet 96. The discharge outlet 96 discharges the liquid in the reservoir 94 to the outside.

Figure 15:
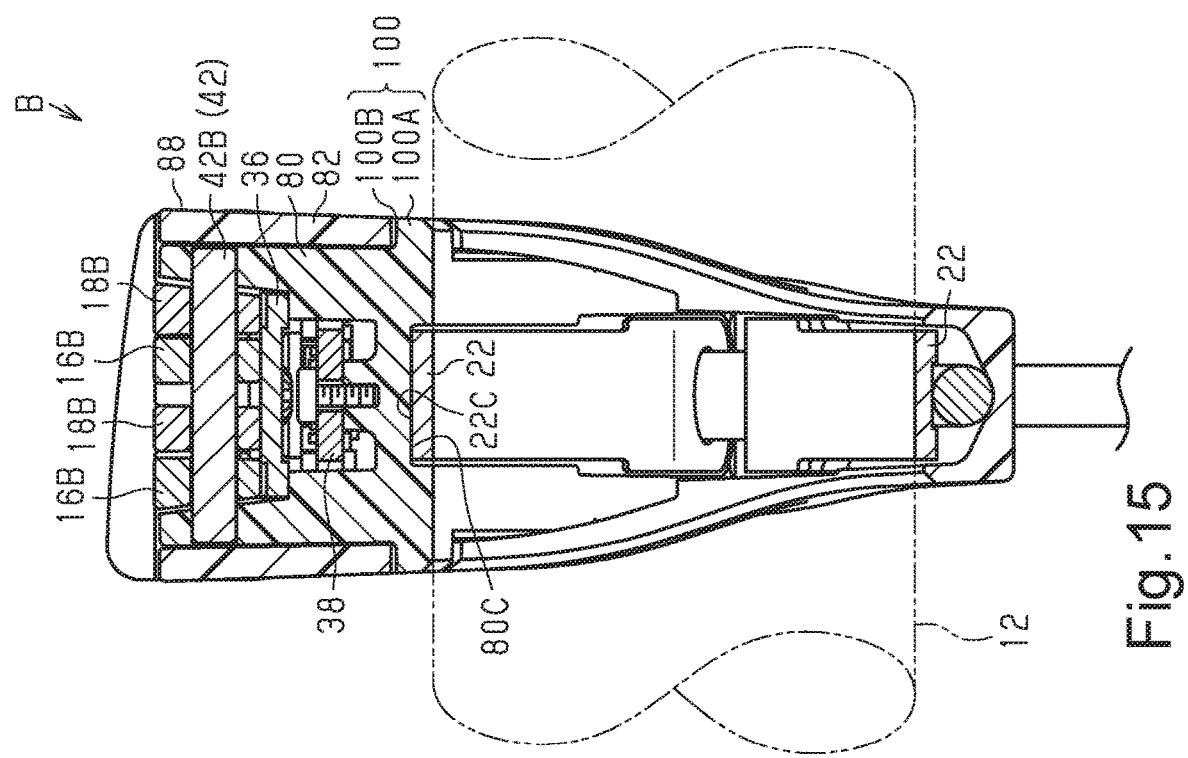
FIG. 15 is a cross-sectional view taken along line D15-D15 of the operating device illustrated in FIG. 8.

As shown in FIGS. 7 and 15, the cover 78 further includes an engagement portion 100 at which the first cover 80 and the second cover 82 are engaged to each other. The engagement portion 100 includes a protrusion 100A provided on one of the first cover 80 and the second cover 82, and a recess 100B provided on the other of the first cover 80 and the second cover 82. The first cover 80 includes the protrusion 100A and the inner circumferential surface 80C facing the outer circumferential surface 22C of the clamp 22. The second cover 82 includes the recess 100B. The protrusion 100A is provided between the inner circumferential surface 80C and the recess 100B. The recess 100B of the second cover 82 is engaged to the protrusion 100A of the first cover 80 so as to combine the first cover 80 and the second cover 82 to form the cover 78.

The protrusion 100A of the first cover 80 is pressed against the recess 100B of the second cover 82 by the tubular member 12 of the human-powered vehicle B. The outer circumferential surface 22C of the clamp 22 is pressed against the inner circumferential surface 80C of the first cover 80 by the tubular member 12 of the human-powered vehicle B.

Figure 11:
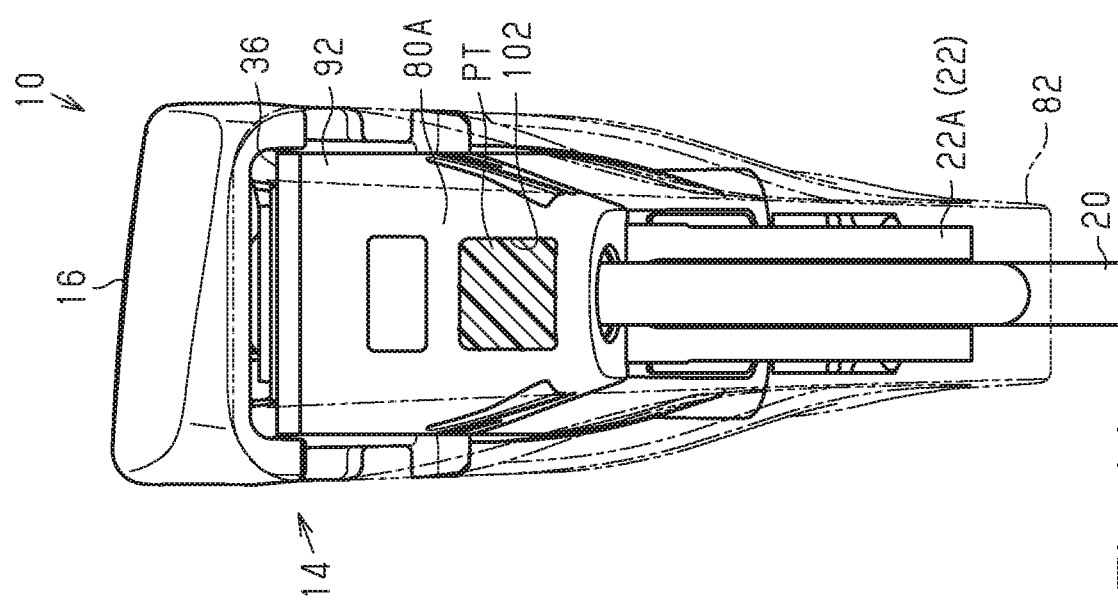
FIG. 11 is a plan view of the human-powered vehicle operating device illustrated in FIG. 7.

The present embodiment further has the advantages described below. As shown in FIG. 11, the opening 102 of the upper surface 80A of the first cover 80 can undergo a potting process to stabilize the position of the cable 20. When a potting portion PT, which is the portion subjected to potting, is provided in the opening 102, the potting portion PT is covered by the second cover 82. This improves the appearance.

Figure 16:
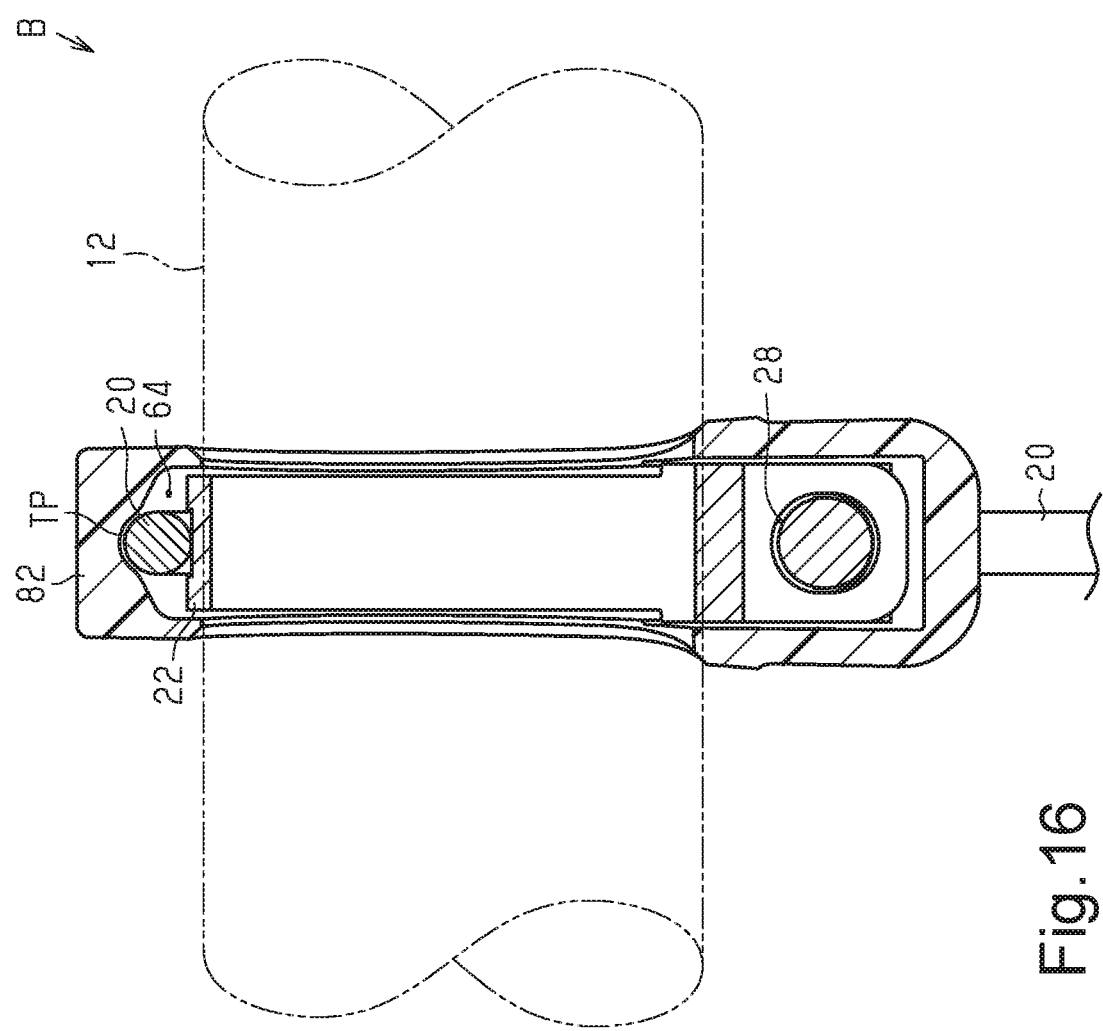
FIG. 16 is a cross-sectional view taken along line D16-D16 of the operating device illustrated in FIG. 8.

As shown in FIG. 15, the pivot shaft 42 extends across the electronic substrate 38A. This configuration limits increases in the dimension W2 as compared with a case where the pivot shaft 42 is arranged at another location. As shown in FIG. 16, the second cover 82 includes the guide passage 64. The guide passage 64 includes a tapered portion TP to position the cable 20. The tapered portion TP extends along the clamp 22. This helps arrangement of the cable 20 along the circumference of the clamp 22.

Modifications

The description related with the above embodiment exemplifies, without any intention to limit, an applicable form of a human-powered vehicle operating device according to the present disclosure. In addition to the embodiment described above, the human-powered vehicle operating device according to the present disclosure is applicable to, for example, modifications of the above embodiments that are described below and combinations of at least two of the modified examples that do not contradict each other. In the modifications described hereafter, same reference numerals are given to those components that are the same as the corresponding components of the above embodiment. Such components will not be described in detail.

Figure 17:
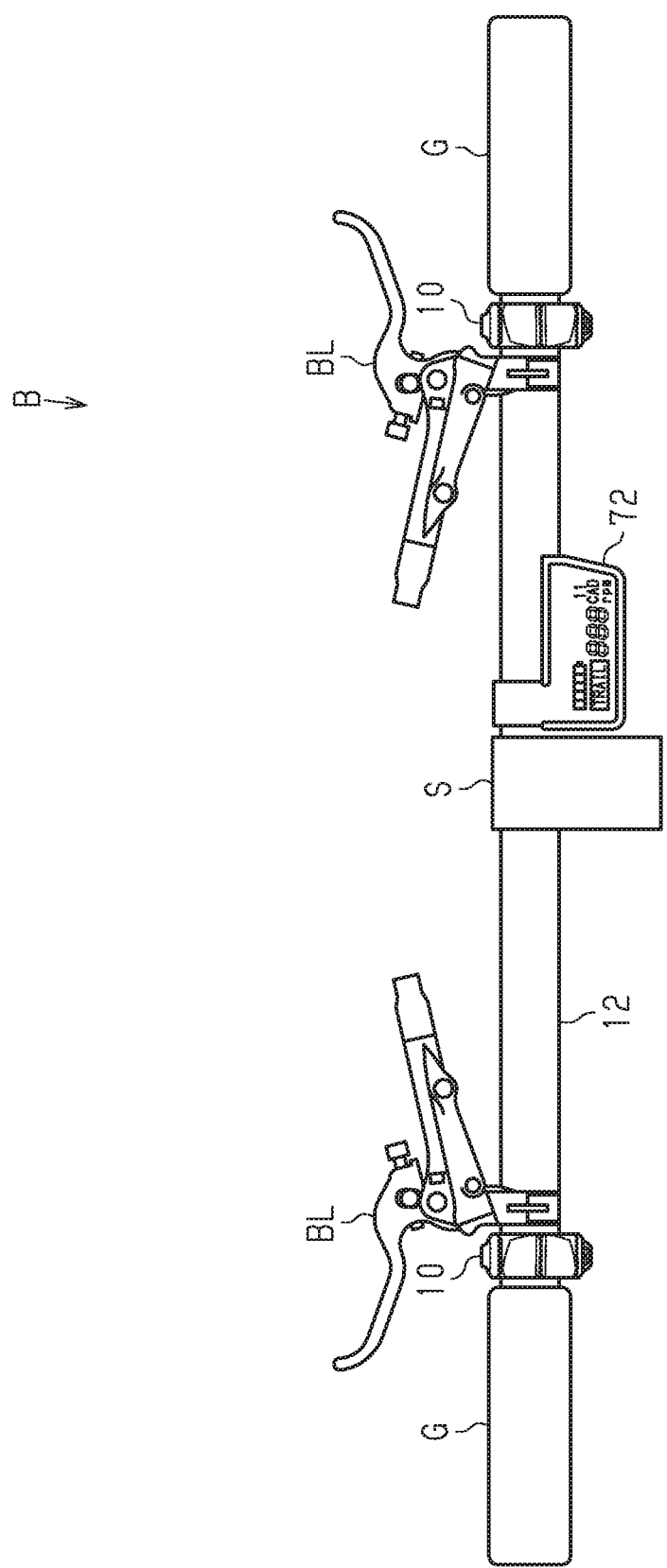
FIG. 17 is a view in which a plurality of human-powered vehicle operating devices is attached to a tubular member.

As shown in FIG. 17, a plurality of operating devices 10 can be provided on the tubular member 12. In such a case, the first operating member 16 and the second operating member 18 can be replaced with each other to enable use on both left and right sides. This allows for reduction in the number of components. There can be one or more of the operating device 10 of the first embodiment and the operating device 10 of the second embodiment.

The operating device 10 and the brake BL can be arranged adjacent to each other. Furthermore, the operating device 10 can be provided on the handlebar adjacent to the grip G. This allows for reduction in the space occupied by such elements. The operating device 10 can be configured to perform wireless communication. In such case, the operating device 10 includes a wireless communication unit that performs wireless communication and a battery that supplies electric power to the wireless communication unit. An example of the wireless communication standard used by the wireless communication unit is ANT+(registered trademark) or Bluetooth (registered trademark). In this case, the operating device 10 can omit the cable 20 and the connecting portion CP. A display 72 for displaying the operation result of the operating device 10 can be provided on the handlebar. The display 72 can be arranged next to the stem S.

Different operations can be set as the operations performed by the first operating member 16 and the second operating member 18. Furthermore, the first operating member 16 and the second operating member 18 can be simultaneously operated to perform a third operation. This will allow the operating device 10 to perform various operations. The cable 20 can extend from the second electrical switch 36B as long as the first guide passage 64A extends over 90° or greater in the circumferential direction of the tubular member 12. The distance between the shaft holes 48A, the shaft holes 48B, and the shaft holes 48C can be changed to any distance. In one example, the distance between the shaft holes 48C can be set to be longer than at least one of the distances between the shaft holes 48A and the shaft holes 48B.

The compositions of the first electrical switch 36A and the second electrical switch 36B can be arbitrarily changed. In one example, the first electrical switch 36A and the second electrical switch 36B can be entirely made of an elastic member. An example of the elastic member is a rubber member. The plate 36C of the switch member 36 can be made from a material different from that of the first electrical switch 36A and the second electrical switch 36B. One example is a plastic resin.

The dimension W1 can be changed to any dimension. In one example, the dimension W1 and the dimension W2 can be set to be the same length. The configuration of the cover 24 can be arbitrarily changed. In the first example, the first cover 32 and the second cover 34 are integrated so as not to be separated. In the second example, the first cover 32 and the second cover 34 are integrated like in the first example but can be separated at a plane including the center line CL1. Each of the covers 32 and 34 includes an engaging portion having a structure similar to that of the first engaging portion 66 and the second engaging portion 68 of the embodiment. The covers 32 and 34 are engaged by the engaging portions. In a preferred example, the cover 24 of the first example and the cover 24 of the second example include a reservoir 94.

The location where the reservoir 94 is provided can be changed to any location. In the first example, the reservoir 94 is provided in the second cover 82, and the reservoir 94 is not provided in the first cover 80. In the second example, the reservoir 94 is provided in both the first cover 80 and the second cover 82. In the third example, the reservoir 94 is provided in at least one of the first cover 32 and the second cover 34 of the cover 24 of the first embodiment.

The number and the size of the recesses 94A formed in the side surface 80B of the first cover 80 can be changed to any number and size. The balance of the center of gravity of the operating device 10 including the first cover 80 in the left-right direction can be improved. The discharge outlet 96 can be provided in the gap SP between the first cover 80 and the clamp 22 or in the gap SP between the second cover 82 and the clamp 22.

Figure 18:
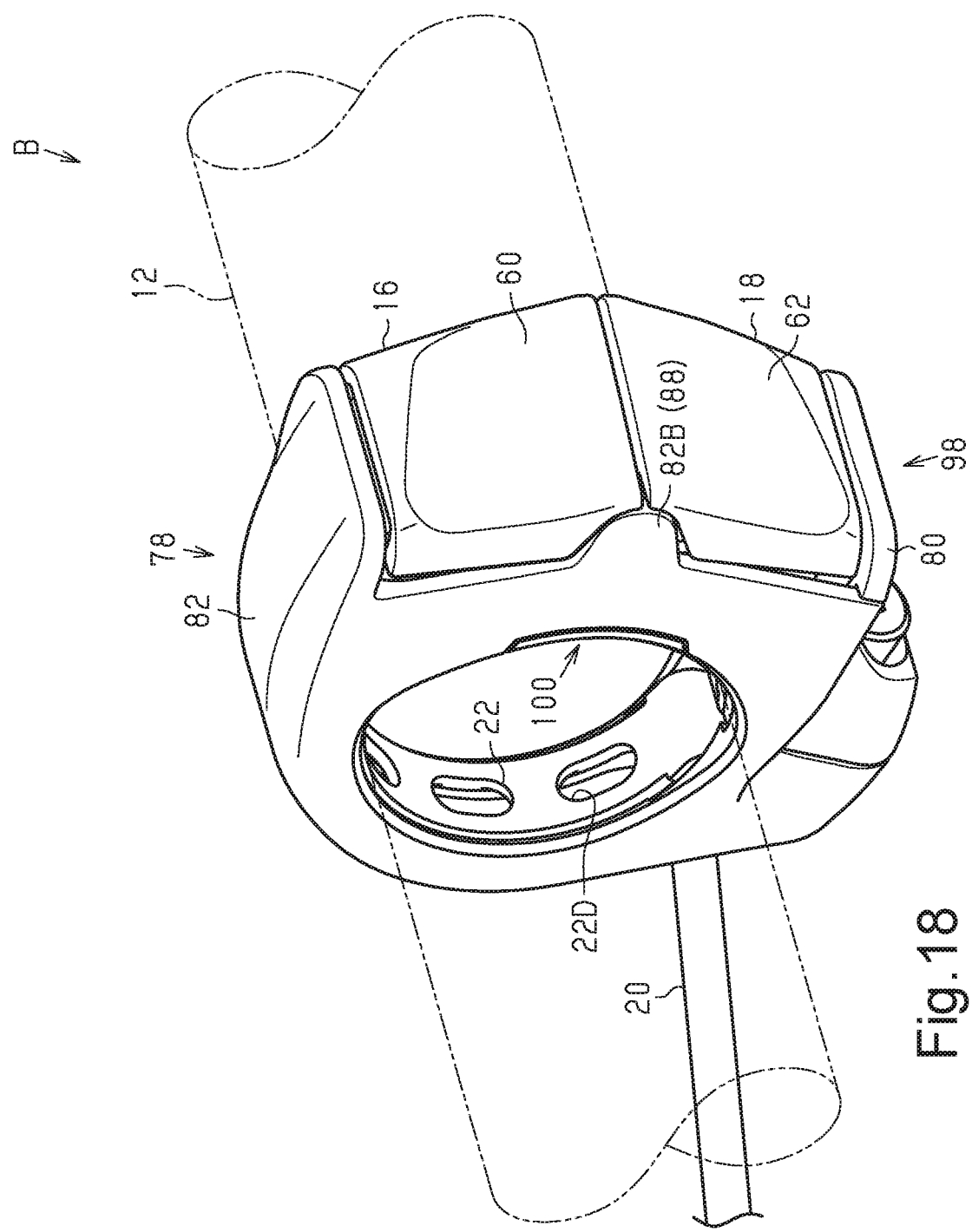
FIG. 18 is a perspective view of a modified human-powered vehicle operating device in accordance with one modification.

As shown in FIG. 18, an opening 22D can be provided in the arcuate portion 22A of the clamp 22. The opening 22D is formed during manufacturing of the clamp 22. This allows the operating device 10 to be reduced in weight.

What is claimed is:

1. A human-powered vehicle operating device comprising:
   a base member;
   a first operating member including a first operating surface and configured to pivot about a first axis with respect to the base member;
   a second operating member including a second operating surface and configured to pivot about a second axis with respect to the base member, the first and second axes being defined by a single pivot shaft of the human-powered vehicle operating device;
   a first electrical switch provided between the base member and the first operating member; and
   a second electrical switch provided between the base member and the second operating member,
   the first operating member and the second operating member being arranged next to each other in a first direction and configured to pivot independent from each other.

2. The human-powered vehicle operating device according to claim 1, wherein
   the first axis and the second axis extend in a second direction.

3. The human-powered vehicle operating device according to claim 2, wherein
   the first direction is orthogonal to the second direction.

4. The human-powered vehicle operating device according to claim 2, wherein
   the base member has a dimension in the second direction that is larger than or equal to 5 mm and smaller than or equal to 30 mm.

5. The human-powered vehicle operating device according to claim 1, wherein
   the base member includes a clamp configured to be attached to a tubular member of the human-powered vehicle; and
   the pivot shaft is parallel to a center axis of the clamp.

6. The human-powered vehicle operating device according to claim 5, wherein
   the first operating member and the second operating member are symmetric to each other with respect to a plane including the pivot shaft and the center axis in a view taken in a direction parallel to the pivot shaft and the center axis.

7. The human-powered vehicle operating device according to claim 5, wherein
   the first direction extends along a circumferential direction of the tubular member.

8. The human-powered vehicle operating device according to claim 5, wherein
   the base member includes a guide passage configured to guides a cable extending from at least one of the first electrical switch and the second electrical switch, and
   the guide passage extends over 90° or greater in the first direction.

9. The human-powered vehicle operating device according to claim 1, wherein
   the base member is configured to be attached to a tubular member of the human-powered vehicle.

10. The human-powered vehicle operating device according to claim 1, wherein
    the first electrical switch and the second electrical switch are provided on an electronic substrate.

11. The human-powered vehicle operating device according to claim 1, wherein
    the base member includes a clamp configured to be attachable to the tubular member of the human-powered vehicle and a cover that at least partially covers the clamp.

12. The human-powered vehicle operating device according to claim 11, wherein
    the clamp includes a first material, and
    the cover includes a second material different from the first material.

13. The human-powered vehicle operating device according to claim 11, wherein
    the first electrical switch and the second electrical switch are provided on the cover.

14. The human-powered vehicle operating device according to claim 11, wherein
    the cover includes a reservoir.

15. The human-powered vehicle operating device according to claim 11, wherein
    the cover includes a first cover and a second cover formed as separate members.

16. The human-powered vehicle operating device according to claim 15, wherein
    at least one of the first cover and the second cover includes a reservoir.

17. The human-powered vehicle operating device according to claim 16, wherein
    the reservoir is provided on the first cover and being covered by the second cover.

18. The human-powered vehicle operating device according to claim 17, wherein
    at least one of the first cover and the second cover further includes a discharge outlet configured to discharges liquid from the reservoir to outside of the cover.

19. The human-powered vehicle operating device according to claim 18, wherein
    the first cover includes the discharge outlet and an exposed portion exposed from the second cover; and
    the discharge outlet includes a discharge passage connecting the reservoir and the exposed portion.

20. The human-powered vehicle operating device according to claim 16, wherein
    the reservoir includes a recess opening on a side surface of the cover.

21. The human-powered vehicle operating device according to claim 15, wherein
    the first cover includes a first covering portion that at least partially covers the clamp.

22. The human-powered vehicle operating device according to claim 15, wherein
    the second cover includes a second covering portion that at least partially covers the first cover.

23. The human-powered vehicle operating device according to claim 22, wherein
    second covering portion at least partially covers the clamp.

24. The human-powered vehicle operating device according to claim 1, wherein
    the base member includes a clamp configured to be attached to a tubular member of the human-powered vehicle and a cover that at least partially covers the clamp, and the cover includes a support member supporting the pivot shaft.

25. The human-powered vehicle operating device according to claim 24, wherein
the support member includes an insertion hole into which the pivot shaft is inserted.

26. The human-powered vehicle operating device according to claim 25, wherein
the cover includes a restricting portion that at least partially covers the insertion hole.

27. The human-powered vehicle operating device according to claim 26, wherein
the cover includes a first cover and a second cover that are separate members;
the first cover includes the support member and a first covering portion that at least partially covers the clamp; and
the second cover includes the restricting portion.

28. The human-powered vehicle operating device according to claim 27, wherein
the cover further includes an engagement portion that engages the first cover and second cover.

29. The human-powered vehicle operating device according to claim 28, wherein
the engagement portion includes a protrusion provided on one of the first cover and the second cover and a recess provided on the other of the first cover and the second cover.

30. The human-powered vehicle operating device according to claim 29, wherein
the first cover includes the protrusion and an inner circumferential surface facing an outer circumferential surface of the clamp,
the second cover includes the recess, and
the protrusion is provided between the inner circumferential surface and the recess.

31. A human-powered vehicle operating device comprising:
a base member;
a first operating member including a first operating surface and configured to pivot about a first axis with respect to the base member;
a second operating member including a second operating surface and configured to pivot about a second axis with respect to the base member;
a first electrical switch provided between the base member and the first operating member; and
a second electrical switch provided between the base member and the second operating member,
the first operating member and the second operating member being arranged next to each other in a first direction and configured to pivot independent from each other, the first axis and the second axis extending in a second direction, the first direction being orthogonal to the second direction,
the first operating surface being asymmetric with respect to a center line extending in the first direction of the first operating surface in a view taken in a direction orthogonal to the first direction and the second direction.

32. The human-powered vehicle operating device according to claim 31, wherein
the first operating surface is increased in area from one side to another side in the second direction.

33. The human-powered vehicle operating device according to claim 31, wherein
the second operating surface is asymmetric with respect to a center line extending in the first direction of the second operating surface in a view taken in a direction orthogonal to the first direction and the second direction.

34. The human-powered vehicle operating device according to claim 33, wherein
the second operating surface is increased in area from one side to another side in the second direction.

35. The human-powered vehicle operating device according to claim 31, wherein
the first operating surface and the second operating surface are line-symmetric with respect to the first axis and the second axis in a view taken in a direction orthogonal to the first direction and the second direction.

36. The human-powered vehicle operating device according to claim 31, wherein
the first operating surface is inclined toward the base member in a direction away from the first axis in the first direction.

37. The human-powered vehicle operating device according to claim 36, wherein
the first operating surface is inclined toward the base member from one side to another side in the second direction.

38. The human-powered vehicle operating device according to claim 31, wherein
the second operating surface is inclined toward the base member in a direction away from the second axis in the first direction.

39. The human-powered vehicle operating device according to claim 38, wherein
the second operating surface is inclined toward the base member from one side to another side in the second direction.

40. A human-powered vehicle operating device comprising:
a base member;
a first operating member including a first operating surface and configured to pivot about a first axis with respect to the base member;
a second operating member including a second operating surface and configured to pivot about a second axis with respect to the base member;
a first electrical switch provided between the base member and the first operating member; and
a second electrical switch provided between the base member and the second operating member,
the first operating member and the second operating member being arranged next to each other in a first direction and configured to pivot independent from each other,
the base member being configured to be attached to a tubular member of the human-powered vehicle, the base member having a dimension in an axial direction of the tubular member that is smaller than a dimension in an axial direction of the first operating member.

* * * * *